(12) United States Patent
Takahashi et al.

(10) Patent No.: US 7,904,813 B1
(45) Date of Patent: Mar. 8, 2011

(54) METHOD FOR EDITING VIDEO INFORMATION AND EDITING DEVICE

(75) Inventors: Yasushi Takahashi, Chiba (JP); Kazuo Sugiyama, Tokyo (JP); Makoto Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1469 days.

(21) Appl. No.: 09/869,254

(22) PCT Filed: Dec. 28, 1999

(86) PCT No.: PCT/JP99/07419
§ 371 (c)(1),
(2), (4) Date: Jun. 26, 2001

(87) PCT Pub. No.: WO00/40011
PCT Pub. Date: Jul. 6, 2000

(51) Int. Cl.
*G06F 3/00* (2006.01)

(52) U.S. Cl. ...................................................... 715/720

(58) Field of Classification Search .................. 345/719, 345/720, 723, 726; 715/719, 720, 722, 723
See application file for complete search history.

(56) References Cited

U.S. PATENT DOCUMENTS

| | | | | | |
|---|---|---|---|---|---|
| 5,821,945 | A | * | 10/1998 | Yeo et al. | 345/440 |
| 5,917,990 | A | * | 6/1999 | Zamara et al. | 386/95 |
| 5,956,026 | A | * | 9/1999 | Ratakonda | 345/723 |
| 5,995,095 | A | * | 11/1999 | Ratakonda | 715/500.1 |
| 6,389,168 | B2 | * | 5/2002 | Altunbasak et al. | 382/224 |
| 6,452,875 | B1 | * | 9/2002 | Lee et al. | 369/30.04 |
| 6,738,100 | B2 | * | 5/2004 | Hampapur et al. | 348/702 |

FOREIGN PATENT DOCUMENTS

| | | |
|---|---|---|
| JP | 4-294694 | 10/1992 |
| JP | 04 294694 | 10/1992 |
| JP | 8 255171 | 10/1996 |
| JP | 10-112835 | 4/1998 |
| JP | 10 150629 | 6/1998 |
| JP | 11-220689 | 8/1999 |
| JP | 11-238071 | 8/1999 |
| JP | 11 238071 | 8/1999 |

* cited by examiner

*Primary Examiner* — Thanh T Vu
(74) *Attorney, Agent, or Firm* — Frommer Lawrence & Haug LLP; William S. Frommer; Thomas F. Presson

(57) ABSTRACT

A regular edition video of a video title is split into shots or scenes with time codes, and provided information, which is the semantic evaluation of the story, is added to the respective scenes to organize the scene score. Necessary scenes for each purpose are extracted on the basis of the scene score and a threshold value (process Pr14). Video characteristic evaluation information is added for each shot constituting each of the extracted scenes so as to organize the shot score (process Pr16). Optimum shots for each of the extracted scenes are selected on the basis of a predetermined rule suitable for the purpose (process Pr16). The optimum shots are sequentially cut out from the regular edition video (process Pr21), thus automatically organizing a preview video suitable for the purpose (process Pr22).

15 Claims, 24 Drawing Sheets

FIG. 4

| TIME (END POINT) | SECOND/SCENE | CHAPTER | SCENE | SHOT | CONTENTS | SCENE EVALUATION VALUE P-OUT | F-VALUE LIMIT Graph | SCENE WHERE LEADING CAST PLAY IPKIS | | | | PREVIEW EDITING | | | | | | PEAK/VALLEY OF GAP OF 0.6 OR GREATER | | | PEAK/VALLEY OF GAP OF 0.8 OR GREATER | | |
|---|---|---|---|---|---|---|---|---|---|---|---|---|---|---|---|---|---|---|---|---|---|---|---|
| | | | | | | | | IPKIS | TINA | MAFIA | OUTLINE | HIGHLIGHT | KEY WORD | IPKIS | TINA | MAFIA | TIME NUMBER | SCENE | LEVEL | TIME NUMBER | SCENE | LEVEL |
| 0:44:00 | 0:44 | 1 | 1 | 0 | SOMEONE IS WORKING IN THE OCEAN | 0.2 | 0.2 | | | | 0.2 | 0.2 | 0.2 | 0.2 | 0.2 | 0.2 | | | | | | |
| 1:04 | 0:20 | | 2 | 13 | THE MASK EMERGES FROM THE BOTTOM OF THE OCEAN | 0.6 | 0.8 | | | | 0.6 | 0.6 | 0.6 | 0.6 | 0.6 | 0.6 | | | | | | |
| 2:13:00 | 1:09 | 2 | 3 | 14 | THE ASKING FOR A DATE IS REFUSED | -0.1 | 0.7 | | | | -0.1 | -0.1 | -0.1 | -0.1 | -0.1 | -0.1 | | | | | | |
| 2:50 | 0:37 | | 4 | 32 | INVITED BY A FRIEND TO A PARTY AT NIGHT | 0.1 | 0.8 | | | | 0.1 | 0.1 | 0.1 | 0.1 | 0.1 | 0.1 | | | | | | |
| 3:32 | 0:42 | 3 | 5 | 40 | A WICKED WOMAN COMES TO THE BANK | 0.2 | 1 | 1 | | | 0.2 | 0.2 | 0.2 | 0.2 | 0.2 | 0.2 | | | | | | |
| 4:23 | 0:51 | | 6 | 49 | SHE CAME TO OPEN AN ACCOUNT | -0.1 | 0.9 | 1 | | | -0.1 | -0.1 | -0.1 | -0.1 | -0.1 | -0.1 | | | | | | |
| 6:12 | 1:49 | | 7 | 56 | TALKS ABOUT THE NECKTIE | 0.1 | 1 | 1 | | | 0.1 | 0.1 | 0.1 | 0.1 | 0.1 | 0.1 | | | | | | |
| 6:20 | 0:08 | | 8 | 75 | A HIDDEN CAMERA IS SET IN HER BAG | 0.5 | 1.5 | | | | 0.5 | 0.5 | 0.5 | 0.5 | 0.5 | 0.5 | | | | | | |
| 6:37 | 0:17 | 4 | 9 | 77 | SOMEONE PULLS THE WIRES | 0.5 | 2 | | | 1 | 0.5 | 0.5 | 0.5 | 0.5 | 0.5 | 0.5 | P1 | 9 | 2 | | | |
| 6:52 | 0:15 | | 10 | 80 | PLOTTING ROBBERY | -0.3 | 1.7 | | | 1 | -0.3 | -0.3 | -0.3 | -0.3 | -0.3 | -0.3 | | | | | | |
| 7:07 | 0:15 | | 11 | 85 | A MAN CALLED NICO IS THE DON | -0.1 | 1.6 | | | 1 | -0.1 | -0.1 | -0.1 | -0.1 | -0.1 | -0.1 | | | | | | |
| 7:40 | 0:33 | | 12 | 88 | PLOTTING TO KILL NICO | -0.2 | 1.4 | | | 1 | -0.2 | -0.2 | -0.2 | -0.2 | -0.2 | -0.2 | V1 | 12 | 1.4 | | | |
| 8:50 | 1:10 | | 13 | 95 | CHARGED HIGH BY A REPAIRMAN | 0.1 | 1.5 | | | | 0.1 | 0.1 | 0.1 | 0.1 | 0.1 | 0.1 | | | | | | |
| 9:55 | 1:05 | 5 | 14 | 105 | COMES TO THE PARTY | 0.1 | 1.6 | 1 | | | 0.1 | 0.1 | 0.1 | 0.1 | 0.1 | 0.1 | | | | | | |
| 10:16 | 0:21 | 6 | 15 | 118 | ANTICIPATED BY A SECURITY GUARD | 0.2 | 1.8 | 1 | | | 0.2 | 0.2 | 0.2 | 0.2 | 0.2 | 0.2 | | | | | | |
| 10:46 | 0:30 | | 16 | 121 | THROWN BY SP | -0.2 | 1.6 | 1 | | | -0.2 | -0.2 | -0.2 | -0.2 | -0.2 | -0.2 | | | | | | |
| 11:39 | 0:53 | 7 | 17 | 126 | SEES THE WOMAN WHO WAS SEEN AT THE BANK | 0.3 | 1.9 | 1 | | | 0.3 | 0.3 | 0.3 | 0.3 | 0.3 | 0.3 | | | | | | |
| 12:37 | 0:58 | 8 | 18 | 138 | THE CAR BREAKS | -0.2 | 1.7 | 1 | | | -0.2 | -0.2 | -0.2 | -0.2 | -0.2 | -0.2 | | | | | | |
| 13:36 | 0:59 | | 19 | 141 | WHO IS THE MAN FLOATING IN THE RIVER? | 0.2 | 1.9 | 1 | | | 0.2 | 0.2 | 0.2 | 0.2 | 0.2 | 0.2 | | | | | | |
| 14:03 | 0:27 | | 20 | 147 | FINDS THE MASK | 0.7 | 2.6 | 1 | | | 0.7 | 0.7 | 0.7 | 0.7 | 0.7 | 0.7 | | | | | | |
| 14:17 | 0:14 | | 21 | 154 | EXAMINED BY THE POLICE | 0.2 | 2.8 | 1 | | | 0.2 | 0.2 | 0.2 | 0.2 | 0.2 | 0.2 | | | | | | |
| 15:04 | 0:47 | 9 | 22 | 156 | SCOLDED BY THE MANAGER | -0.2 | 2.6 | 1 | | | -0.2 | -0.2 | -0.2 | -0.2 | -0.2 | -0.2 | P2 | 24 | 2.8 | | | |
| 16:11 | 1:07 | 10 | 23 | 164 | HAS A CLEVER DOG | -0.2 | 2.4 | 1 | | | -0.2 | -0.2 | -0.2 | -0.2 | -0.2 | -0.2 | | | | | | |
| 16:33 | 0:22 | | 24 | 178 | A BOOK "AGENT'S MASK" IS INTRODUCED ON TV | -0.2 | 2.2 | 1 | | | -0.2 | -0.2 | -0.2 | -0.2 | -0.2 | -0.2 | V2 | 24 | 2.2 | | | |
| 17:13 | 0:40 | 11 | 25 | 185 | THE MASK IS ABOUT TO BITE | 0.6 | 2.8 | 1 | | | 0.6 | 0.6 | 0.6 | 0.6 | 0.6 | 0.6 | | | | | | |
| 17:24 | 0:11 | | 26 | 189 | THE MASK STICKS | 0.8 | 3.6 | 1 | | | 0.8 | 0.8 | 0.8 | 0.8 | 0.8 | 0.8 | | | | | | |
| 17:37 | 0:13 | | 27 | 194 | STRANGLED | 0.5 | 4.1 | 1 | | | 0.5 | 0.5 | 0.5 | 0.5 | 0.5 | 0.5 | | | | | | |
| 17:47 | 0:10 | | 28 | 199 | STARTS TO ROTATE | 0.4 | 4.5 | 1 | | | 0.4 | 0.4 | 0.4 | 0.4 | 0.4 | 0.4 | | | | | | |
| 18:06 | 0:19 | | 29 | 202 | EMERGES AS A DIFFERENT PERSONALITY | 0.7 | 5.2 | 1 | | | 0.7 | 0.7 | 0.7 | 0.7 | 0.7 | 0.7 | | | | | | |
| 18:23 | 0:17 | | 30 | 203 | TAKES OUT A STRANGE CLOCK | 0.1 | 5.3 | 1 | | | 0.1 | 0.1 | 0.1 | 0.1 | 0.1 | 0.1 | | | | | | |
| 18:45 | 0:22 | | 31 | 210 | RACES | 0.2 | 5.5 | 1 | | | 0.2 | 0.2 | 0.2 | 0.2 | 0.2 | 0.2 | | | | | | |
| 18:53 | 0:08 | | 32 | 220 | FOUND BY THE MANAGER | 0.3 | 5.8 | 1 | | | 0.3 | 0.3 | 0.3 | 0.3 | 0.3 | 0.3 | | | | | | |
| 19:00 | 0:07 | | 33 | 224 | CAN MAKE AMAZING MOVEMENT | -0.4 | 5.4 | 1 | | | -0.4 | -0.4 | -0.4 | -0.4 | -0.4 | -0.4 | | | | | | |
| 19:21 | 0:21 | | 34 | 223 | FALLS BUT IS NOT DEAD | 0.6 | 6 | 1 | | | 0.6 | 0.6 | 0.6 | 0.6 | 0.6 | 0.6 | P3 | 34 | 6 | P1 | 34 | 6 |
| 19:39 | 0:18 | | 35 | 235 | BREAKS GLASS WINDOWS OF A CAR WITH A HORN | -0.4 | 5.6 | 1 | | | -0.4 | -0.4 | -0.4 | -0.4 | -0.4 | -0.4 | | | | | | |
| 20:17 | 0:38 | 12 | 36 | 246 | INVOLVED IN A QUARREL | 0.2 | 5.8 | 1 | | | 0.2 | 0.2 | 0.2 | 0.2 | 0.2 | 0.2 | | | | | | |
| 21:18 | 1:01 | | 37 | 256 | MAKES SPORT OF THEM | -0.3 | 5.5 | 1 | | | -0.3 | -0.3 | -0.3 | -0.3 | -0.3 | -0.3 | | | | | | |
| 21:49 | 0:31 | | 38 | 272 | HAS AN AMAZING POWER | -0.5 | 5 | 1 | | | -0.5 | -0.5 | -0.5 | -0.5 | -0.5 | -0.5 | | | | | | |
| 22:17 | 0:28 | 13 | 39 | 284 | TAKES REVENGE ON THE REPAIR FACTORY | -0.3 | 4.7 | 1 | | | -0.3 | -0.3 | -0.3 | -0.3 | -0.3 | -0.3 | | | | | | |
| 23:01 | 0:44 | 14 | 40 | 290 | MISTAKES IT FOR A DREAM | -0.1 | 4.6 | 1 | | | -0.1 | -0.1 | -0.1 | -0.1 | -0.1 | -0.1 | | | | | | |
| 24:21:00 | 1:20 | | 41 | 291 | THE POLICE COMES AND ASKS ABOUT THE LAST NIGHT'S TROUBLE | 0.2 | 4.8 | 1 | | | 0.2 | 0.2 | 0.2 | 0.2 | 0.2 | 0.2 | | | | | | |
| 25:17:00 | 0:56 | | 42 | 305 | THROWS THE MASKS AWAY | 0.3 | 5.1 | 1 | | | 0.3 | 0.3 | 0.3 | 0.3 | 0.3 | 0.3 | | | | | | |
| 22:25:00 | 0:06 | | 43 | 318 | COMES BACK | -0.2 | 4.9 | 1 | | | -0.2 | -0.2 | -0.2 | -0.2 | -0.2 | -0.2 | | | | | | |
| 25:55:00 | 0:30 | | 44 | 321 | FINDS THAT AN AWFUL TROUBLE HAS OCCURRED | -0.2 | 4.7 | 1 | | | -0.2 | -0.2 | -0.2 | -0.2 | -0.2 | -0.2 | | | | | | |
| 27:11:00 | 1:16 | 15 | 45 | 323 | FINDS HER IN THE MORNING PAPER | -0.2 | 4.5 | 1 | | | -0.2 | -0.2 | -0.2 | -0.2 | -0.2 | -0.2 | | | | | | |
| 27:54:00 | 0:43 | 16 | 46 | 338 | A DIFFERENT WOMAN COMES TO SEE | 0.1 | 4.6 | 1 | | | 0.1 | 0.1 | 0.1 | 0.1 | 0.1 | 0.1 | | | | | | |
| 28:19:00 | 0:25 | | 47 | 345 | INVESTIGATION INTO THE REPAIR FACTORY | 0.2 | 4.8 | 1 | | | 0.2 | 0.2 | 0.2 | 0.2 | 0.2 | 0.2 | | | | | | |
| | | | 48 | 349 | RECOGNIZES THE VOICE ALONE | -0.2 | 4.6 | 1 | | | -0.2 | -0.2 | -0.2 | -0.2 | -0.2 | -0.2 | | | | | | |
| 29:56:00 | | | 49 | 363 | SHE SAYS SHE IS A STANLEY'S FAN | -0.2 | 4.4 | 1 | | | -0.2 | -0.2 | -0.2 | -0.2 | -0.2 | -0.2 | | | | | | |
| 31:58:00 | 2:02:00 | 17 | 50 | 367 | DORIAN IS ATTACKED BY THE BOSS | 0.3 | 4.7 | 1 | | | 0.3 | 0.3 | 0.3 | 0.3 | 0.3 | 0.3 | | | | | | |

| C1 | C2 | C3 | C4 | C5 | C6 | C7 | C8 | C9 | C10 | C11 | |
|---|---|---|---|---|---|---|---|---|---|---|---|
| 2 | 13 | | | | | | | 1 | | | 1 |
| | 13-3 | | | | 1 | | | 1 | | 1 | 4 |
| 20 | 147 | 1 | | | | | | | | | 3 |
| | 148 | 1 | | | | | 1 | | | | 4 |
| | 148-2 | 1 | | | | | | 1 | | | 4 |
| | 149 | 1 | | | | | 1 | 1 | | | 5 |
| | 150 | 1 | | | | | | 1 | | 1 | 6 |
| | 151 | 1 | | | | | 1 | | | | 4 |
| | 152 | 1 | | | 1 | | | | | | 5 |
| | 153 | 1 | 1 | | 1 | | 1 | | | | 8 |
| 25 | 185 | | | | | 1 | | 1 | | | 2 |
| | 186 | 1 | 1 | | | | 1 | 1 | | | 7 |
| | 187 | 1 | 1 | | | 1 | 1 | | | | 7 |
| | 187-6 | 1 | 1 | | | | 1 | | | | 6 |
| | 187-8 | 1 | 1 | | 1 | | 1 | 1 | | 1 | 10 |
| | 188 | 1 | | | 1 | | | | | | 5 |
| 26 | 189 | 1 | | | | | | 1 | | 1 | 5 |
| | 190 | | | | | 1 | | 1 | | | 2 |
| | 191 | 1 | | | | | 1 | | | | 4 |
| | 192 | 1 | | | 1 | | | | | | 5 |
| | 193 | 1 | | | 1 | | 1 | 1 | | 1 | 8 |
| | 194 | 1 | | | | | 1 | 1 | | 1 | 7 |
| | 194-23 | | | | 1 | 1 | | 1 | | | 4 |
| | 195 | 1 | | 1 | 1 | | 1 | 1 | | 1 | 10 |
| | 198 | | | | 1 | 1 | | 1 | | 1 | 5 |
| | 198 | 1 | | | 1 | | 1 | 1 | | 1 | 8 |
| 29 | 202 | 1 | 1 | | | | 1 | | | | 6 |
| | 202-25 | 1 | 1 | | | | 1 | 1 | | | 7 |
| | 202-9 | 1 | 1 | | 1 | | | 1 | | | 8 |
| | 202-4 | 1 | | | 1 | | | | | | 5 |
| 34 | 233 | 1 | | 1 | | | 1 | 1 | 1 | 1 | 9 |
| | 233-74 | 1 | 1 | | | | | 1 | | 1 | 7 |
| | 234 | 1 | | | | | | 1 | | 1 | 5 |
| 52 | 395 | 1 | 1 | | | | | | | | 5 |
| | 396 | | | | | | | | | | 0 |
| | 397 | 1 | | | | | 1 | | | | 4 |
| | 398 | | | | | | | | | | 0 |
| | 399 | 1 | | | | | 1 | | | | 4 |
| | 400 | 1 | 1 | | 1 | | 1 | 1 | | | 9 |
| | 401 | | | | 1 | 1 | | 1 | | 1 | 5 |
| | 403 | | | | 1 | | | 1 | | 1 | 4 |
| | 407 | | | | 1 | 1 | | 1 | | 1 | 5 |
| | 408 | 1 | 1 | | 1 | | | 1 | 1 | 1 | 10 |
| | 409 | 1 | | | 1 | | 1 | 1 | | | 7 |
| 62 | 527 | 1 | | | 1 | 1 | | | | | 6 |
| | 528 | 1 | | | 1 | | | | | | |
| | 532 | | | | 1 | 1 | 1 | | | | |
| | | | | | 1 | | | | | | |

C1:SCENE  C2:SHOT  C3:LEADING AND SUPPPORTING ACTORS/ACTRESSES
C4:PRESENCE/ABSENCE OF SPEECH  C5:EXCLAMATION AND EXPLOSION
C6:BGM EXCITEMENT  C7:OTHER ACTORS/ACTRESSES
C8:BEST SHOT OR HIGHER  C9: SOUND EFFECT
C10:INTENSE SCREEN CHANGE  C11:SFX AND FLASH

FIG.5

| C1 | C2 | C3 | C4 | C5 | C6 | C7 | C8 | C9 | C10 | C11 | |
|----|----|----|----|----|----|----|----|----|-----|-----|---|
| 8 | 75 | 1 | | | | 1 | | | | | 5 |
| | 76 | | 1 | | | | | | | | 2 |
| 62 | 527 | | | | 1 | 1 | | | | | 3 |
| | 528 | 1 | | | 1 | 1 | | | | | 5 |
| | 532 | | | | 1 | 1 | 1 | | | 1 | 4 |
| | 532-5 | 1 | | | 1 | 1 | | | 1 | | 7 |
| | 532-9 | 1 | | | 1 | | | | 1 | | 7 |
| | 533 | | | | 1 | 1 | | 1 | | 1 | 5 |
| | 536 | 1 | | | 1 | 1 | | | 1 | | 7 |
| | 537 | 1 | | | 1 | | | | 1 | | 6 |
| | 538 | | | | 1 | 1 | 1 | | | | 4 |
| | 539 | 1 | | | 1 | | | 1 | | 1 | 7 |
| | 539-13 | | | | 1 | | | 1 | | 1 | 4 |
| | 539-15 | | | | 1 | 1 | | 1 | | 1 | 5 |
| | 540 | | | | 1 | | | 1 | | 1 | 4 |
| | 541 | | | | 1 | 1 | 1 | 1 | | | 5 |
| | 545 | | | | 1 | | | 1 | | 1 | 4 |
| | 547 | 1 | | | 1 | | | | | | 8 |
| | 553 | | 1 | | 1 | 1 | | | | | 5 |
| | 554 | | | | 1 | 1 | 1 | | | | 4 |
| | 555 | 1 | | | 1 | | 1 | | | | 5 |
| | 556 | | | | 1 | 1 | 1 | | | | 4 |
| | 557 | | | | 1 | | | 1 | | 1 | 4 |
| | 558 | | | | 1 | | 1 | | | | 6 |
| 65 | 564 | 1 | 1 | | 1 | | | | | | 5 |
| | 564-8 | | | | 1 | | | | | | 1 |
| | 565 | 1 | | | 1 | | | | | | 3 |
| | 566 | 1 | | | | | | | | | 5 |
| | 567 | 1 | | | 1 | | | | | | 3 |
| | 568 | 1 | | | 1 | | | 1 | | 1 | 5 |
| | 569 | 1 | | | 1 | | | | | | 3 |
| | 572 | 1 | | | | | | | | | 3 |
| | 573 | 1 | | | | | | | | | 3 |
| | 574 | | | | | | | | | | |

C1:SCENE C2:SHOT C3:TINA C4:PRESENCE/ABSENCE OF SPEECH
C5:EXCRAMATION AND EXPLOSION C6:BGM EXCITEMENT
C7:OTHER ACTORS/ACTRESSSES C8:BEST SHOT OR HIGHER
C9:SOUND EFFECT C10:INTENSE SCREEN CHANGE C11:SFX AND FLASH

FIG.6

METHOD FOR EDITING VIDEO INFORMATION AND EDITING DEVICE

TECHNICAL FIELD

This invention relates to a video information editing method and editing device, and particularly to a video information editing method and editing device related with generation of preview video of a video title.

BACKGROUND ART

Video titles having stories like movies, television dramas and documentary programs are provided as merchandise through networks such as ground wave/satellite broadcast and the Internet, or through DVD and other package media. Viewers obtain desired ones of such video titles by purchasing them.

When selecting a certain video title having a story, the viewers effectively use preview video of a preview film or the like.

In general, a preview film is prepared for a movie to be on the screen at theaters. However, such a preview film is not necessarily suitable for the use through networks like broadcast and the Internet or through DVD and other package media, since extra advertisement and narration of an inappropriate time are included.

Thus, at present, the sending side of a video title prepares a unique preview video for each video title and provides it to viewers.

Meanwhile, viewers want to decide purchase and appreciation of the regular edition of a video title after watching its preview videos featuring various points of interest of the viewers such as outline, highlight and main cast. It is preferred to prepare several types of preview videos corresponding to the purposes in order to meet the requests of the viewers. Currently, however, since only one preview video is prepared by the sending side, various types of preview videos as requested by the viewers cannot be provided.

Moreover, particular sensitivity and talents and a large amount of cost are required for the production of preview videos. Particularly these days, the distribution of a large quantity of contents is commonly accepted and there are few such talents. At present, it is very difficult to produce preview videos from various viewpoints or preview videos of a time (length) corresponding to the purpose, in a short period of time and at a low cost.

DISCLOSURE OF THE INVENTION

In view of the foregoing status of the art, it is an object of the present invention to provide a video information editing method and editing device which realize editing of various types of preview videos and which easily enable editing of preview videos of a desired time length.

A video information editing method according to the present invention includes the steps of: delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; preparing an evaluation value of each of the shots or each of the scenes on the basis of the information provided corresponding to each of the shots or each of the scenes; and selecting from the regular edition video the shots or the scenes such that each of the evaluation values of the shots or the scenes satisfies a predetermined condition.

Also, a video information editing method according to the present invention includes the steps of: delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; preparing an evaluation value of each of the scenes on the basis of the information provided corresponding to each of the scenes; selecting from the regular edition video the scenes such that each of the evaluation values of the scenes satisfies a predetermined first condition; preparing an evaluation value of each of the shots included in each of the selected scenes on the basis of the information provided corresponding to each of the shots; and selecting the shots such that each of the evaluation values of the shots satisfies a predetermined second condition.

Also, a video information editing method according to the present invention includes the steps of: delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; preparing an evaluation value of each of the shots or each of the scenes on the basis of the information provided corresponding to each of the shots or each of the scenes; and selecting from the regular edition video the shots or the scenes such that each of the evaluation values of the shots or the scenes satisfies a predetermined condition.

Moreover, a video information editing method according to the present invention includes the steps of: delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; preparing an evaluation value of each of the scenes on the basis of the information provided corresponding to each of the scenes; selecting from the regular edition video the scenes such that each of the evaluation values of the scenes satisfies a predetermined first condition; preparing an evaluation value of each of the shots included in each of the selected scenes on the basis of the information provided corresponding to each of the shots; selecting the shots such that each of the evaluation values of the shots satisfies a predetermined second condition; and coding and outputting, or readably recording and saving, data including at least the recording position information or the time lapse information associated with each of the selected shots and the evaluation values of the shots.

A video information editing device according to the present invention includes: means for delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; means for preparing an evaluation value of each of the shots or each of the scenes on the basis of the information provided corresponding to each of the shots or each of the scenes; and means for selecting from the regular edition video the shots or the scenes such that each of the evaluation values of the shots or the scenes satisfies a predetermined condition.

Also, a video information editing device according to the present invention includes: means for delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; means for preparing an evaluation value of each of the scenes on the basis of the information provided corresponding to each of the scenes; means for selecting from the regular edition video the scenes such that each of the evaluation values of the scenes satisfies a predetermined first condition; means for preparing an evaluation value of each of the shots included in each of the selected scenes on the basis of the information provided corresponding to each of the shots; and means for selecting the shots such that each of the evaluation values of the shots satisfies a predetermined second condition.

Moreover, a video information editing device according to the present invention includes: means for delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes; means for preparing an evaluation value of each of the scenes on the basis of the information provided corresponding to each of the scenes; means for selecting from the regular edition video the scenes such that each of the evaluation values of the scenes satisfies a predetermined first condition; means for preparing an evaluation value of each of the shots included in each of the selected scenes on the basis of the information provided corresponding to each of the shots; and means for selecting the shots such that each of the evaluation values of the shots satisfies a predetermined second condition.

BRIEF DESCRIPTION OF THE DRAWINGS

FIG. 4 shows an exemplary work in a semantic score organization process of the method of the present invention, in which a scene score table for the movie "MASK" is shown.

FIG. 5 shows an exemplary work in a shot score preparation process of the method of the present invention, in which a shot score table for the movie "MASK" is shown.

FIG. 6 shows another exemplary work in the shot score preparation process of the method of the present invention, in which a shot score table for the main cast, Tina, of the movie "MASK".

BEST MODE FOR CARRYING OUT THE INVENTION

Figure 1:
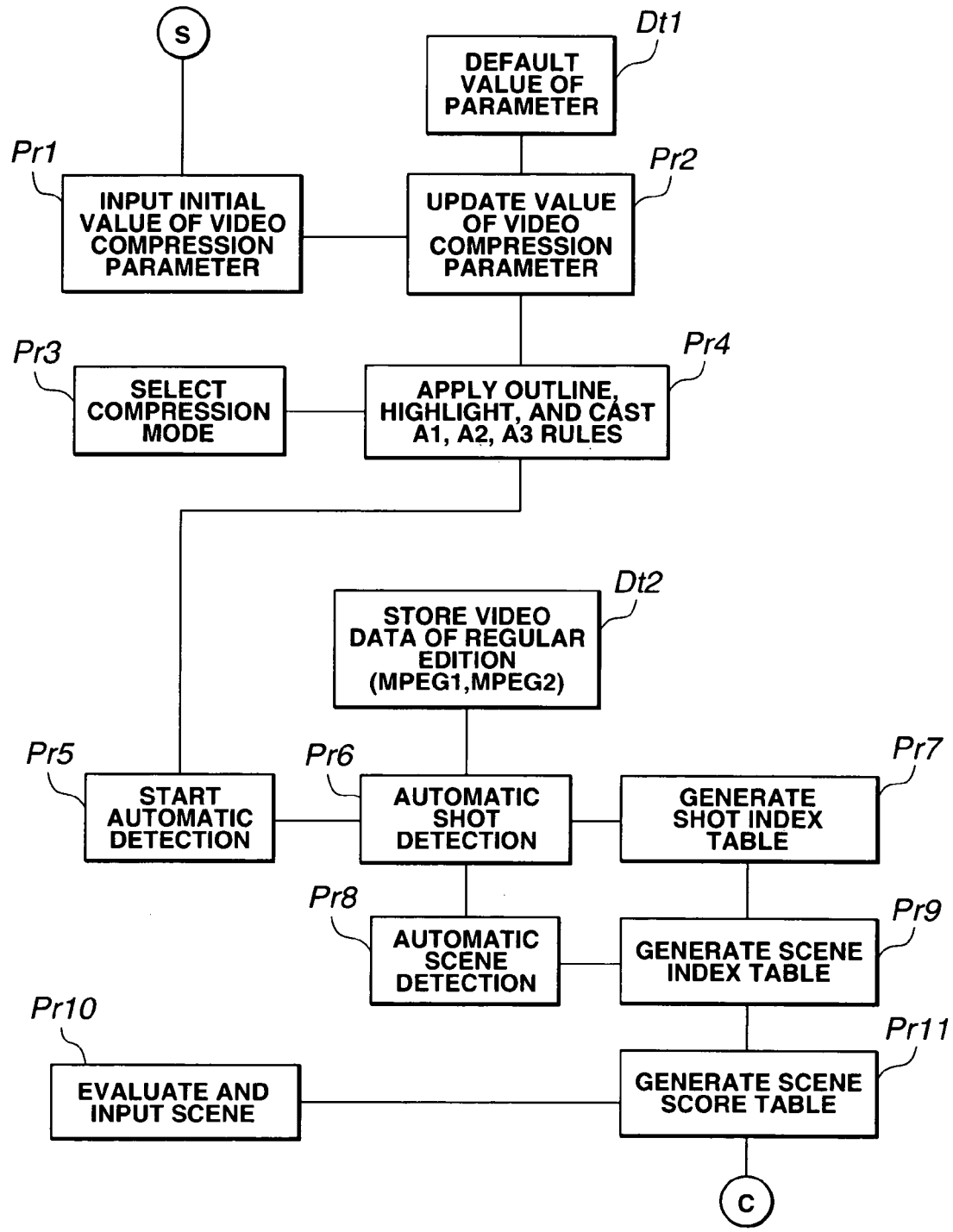
FIG. 1 is an explanatory view illustrating the process of an embodiment of an extracted video organization method according to the present invention.

The video information editing method and device according to the present invention, for example, have the function to split the regular edition video of a video title such as a movie or a television program into scenes and shots (later defined), add semantic evaluation information of the story of each scene and evaluation information in terms of video characteristics of each shot which are externally provided as provided conditions to each scene and shot to edit the semantic score, record and save the semantic score, and automatically decide a cut-out point of the regular edition video on the basis of a predetermined rule set for each purpose by using the semantic score, thereby automatically organizing a preview video matching the purpose and a predetermined time length, recording and utilizing the semantic score for automatic organization, or editing a semantic code for automatic organization of the preview video.

The work for organizing the preview video from the regular edition video on the basis of a unique view point as described above can be regarded as the preparation of a literary work. Thus, in the present invention, an extracted video organization device having such a function is referred to as an authoring tool or an authoring device.

Moreover, the video information editing device having the function to edit a semantic code which enables generation of a preview video from the regular edition video on the basis of a unique viewpoint can also be handled as an authoring tool or an authoring device in a broad sense.

Prior to the description of embodiments, definition and explanation of terms will now be made.

A shot is a minimum unit of continuous dynamic images. It is equivalent to a film shot of a movie.

A scene is a collection of several shots and is a unit for constituting the semantics of a story.

Recording position information is the information indicating the recording position on a recording medium, of scene and shots recorded on the recording medium. It includes all the information related to the recording position such as absolute sector number, absolute track number, time code, absolute record number and the like.

Semantic evaluation of video is the evaluation with respect to the impact of the video on the course of the story. The semantic evaluation is made by an evaluator or is automatically made in conformity with a predetermined standard. The evaluation value in this evaluation is provided as the semantic evaluation information of the video. Therefore, in the present invention, the semantic evaluation information of the video is handled as a "provided condition".

While the semantic evaluation information of the video is normally provided for each scene, it may be provided for each shot.

Evaluation in terms of video characteristics is the evaluation with respect to characteristics of the video, for example, the evaluation with respect to the presence/absence of speech of actors and special effects such as a large acoustic effect. The evaluation value in this evaluation is provided as the evaluation information in terms of video characteristics.

This evaluation is made by an evaluator, or the evaluation value is automatically calculated in conformity with a predetermined standard. Alternatively, an evaluator confirms the presence/absence of a single or a plurality of video characteristic items, and on the basis of the presence/absence information as a provided condition, the evaluation value is automatically calculated.

While the evaluation information in terms of video characteristics is normally provided for each shot, it may be provided for each scene.

A regular edition video is a collection of plural scenes and shots constituting each video title (e.g., one broadcasting program or one film/drama) and is formed in time width from the beginning to the end of the video title. A video title distributed through a broadcasting program or through a network, or a video title recorded and provided on a cassette magnetic tape or a package-based recording medium like an optical disc is usually constituted by such a regular edition video.

A preview video is a short video such as an abstract corresponding to the purpose, which contains extracted portions from a regular edition video. Therefore, the same video as the video constituting the preview video is included in the regular edition video. Each purpose of the preview video is handled as each mode. Therefore, if there are various purposes, various modes exist.

Such modes may be an outline mode, a highlight mode, an actor-oriented mode and the like.

The preview video contains at least a video formed by extracting and connecting the scenes and shots such that the semantic evaluation value of the video and/or the evaluation value in terms of video characteristics satisfy predetermined conditions, from the scenes and shots constituting the regular edition video. Therefore, the preview video may be constituted by connecting only the scenes extracted from the regular edition video, or by connecting only the shots extracted from the regular edition video, or by connecting the shots and scenes extracted from the regular edition video.

Two-step screening is a technique related with the organization of the preview video. As the screening of the first step, only the scene such that the semantic evaluation value of the video of each scene as a provided condition meets a predetermined condition is extracted from the regular edition video. As the screening of the second step, the shots such that the evaluation value in terms of video characteristics meets a predetermined condition are extracted from the extracted scene, and the extracted shots are connected to organize the preview video.

Therefore, in general, the extracted scene and suitable shots vary depending on the mode of the preview video.

A preview video organization rule is a rule for selecting and designating a video to be extracted from the regular edition video in accordance with the preview mode and the time length.

A semantic score is the information in the form of a table in which the semantic evaluation value (scene score) as a provided condition is associated with all the scenes constituting the regular edition video of the video title while the evaluation value in terms of video characteristics (shot score) is associated with all the shots or at least a part of the shots, and in which these pieces of information are associated with the recording position information or the time lapse information (time code) of at least each scene and each shot and recorded as respective items. Also, various attributes of each scene and each shot are recorded in this table.

On the basis of the contents of the semantic score, the corresponding scene is extracted from the regular edition video, and shots are selected and connected from the extracted scene so as to organize the preview video.

The semantic score is one type of meta information of the regular edition video. It provides an efficient data code (semantic code) for carrying out editing and automatic production of the compressed video of the regular edition, automatic production of the preview video on a viewer's terminal, and generation of an interactive browser which sensuously expresses the course of the story.

A semantic code is the information in the form of a code, constituted by selecting at least a part of all the items of the semantic score and coding the contents thereof. Therefore, in the semantic code, for example, the recording position information or the time lapse information and the result of evaluation in terms of video characteristics, of a selected shot in a selected scene are described as respective codes.

Such a semantic code is edited as associated information with respect to each video title, that is, as meta information, and provides an efficient data code for carrying out automatic production of the preview video at a viewer's terminal and interactive browsing which sensuously expresses the course of the story. For example, on the basis of the semantic code, the corresponding shots of the regular edition video are extracted and connected to form the preview video.

A video signal described in the present invention includes a signal related to a dynamic image and a signal related to a sound, as a matter of convenience.

Preferred embodiments of the present invention will now be described with reference to the attached drawings. The following embodiments are a part of preferred examples for describing the essential structure and effect of the present invention and therefore include various limitations suitable in terms of technical configuration. However, the scope of the present invention is not limited to these embodiments unless so described.

Figure 2:
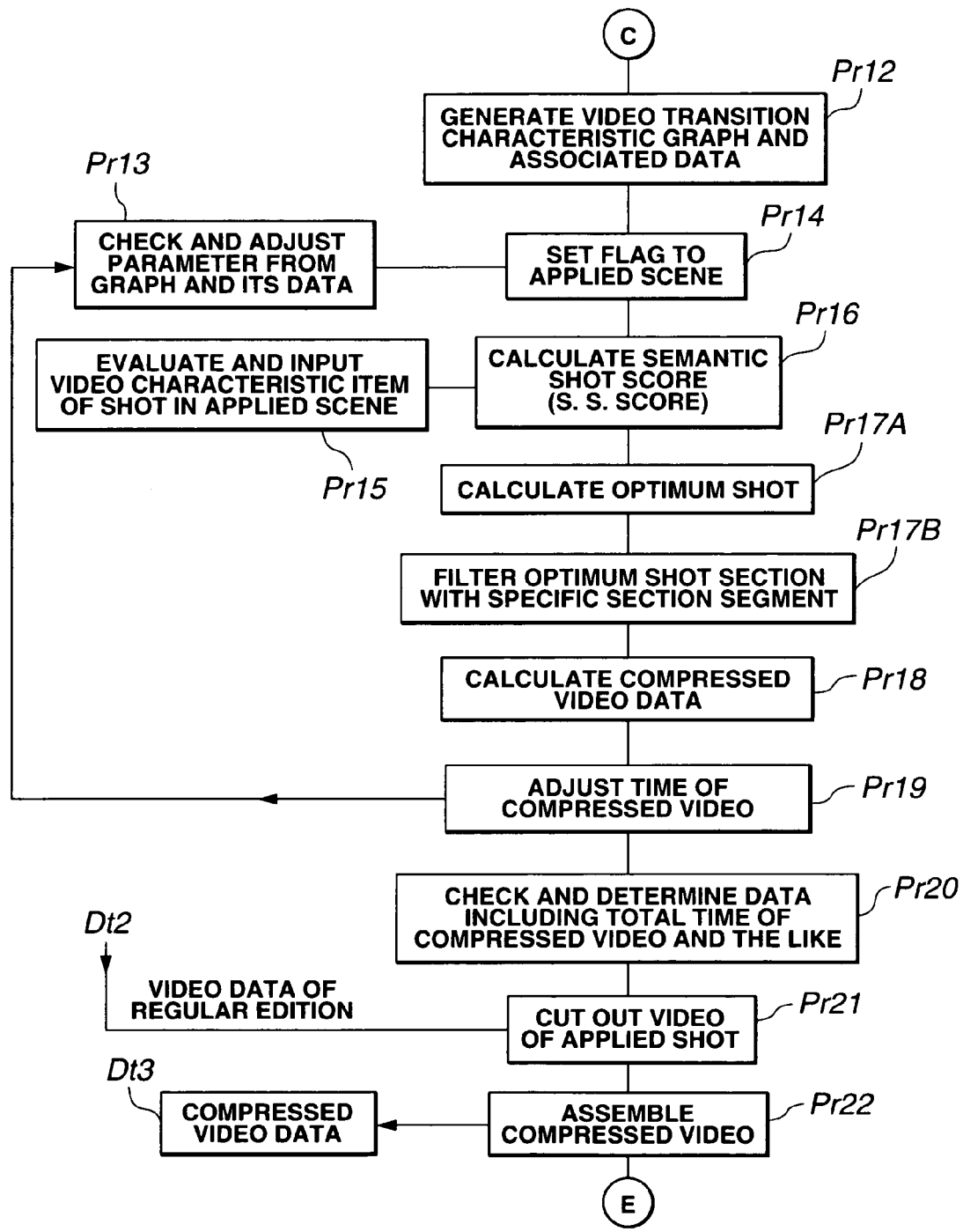
FIG. 2 is an explanatory view continuing from FIG. 1.

FIG. 1 is an explanatory view illustrating the process of an embodiment of an extracted video organization method according to the present invention. FIG. 2 is an explanatory view continuing from FIG. 1.

Figure 3:
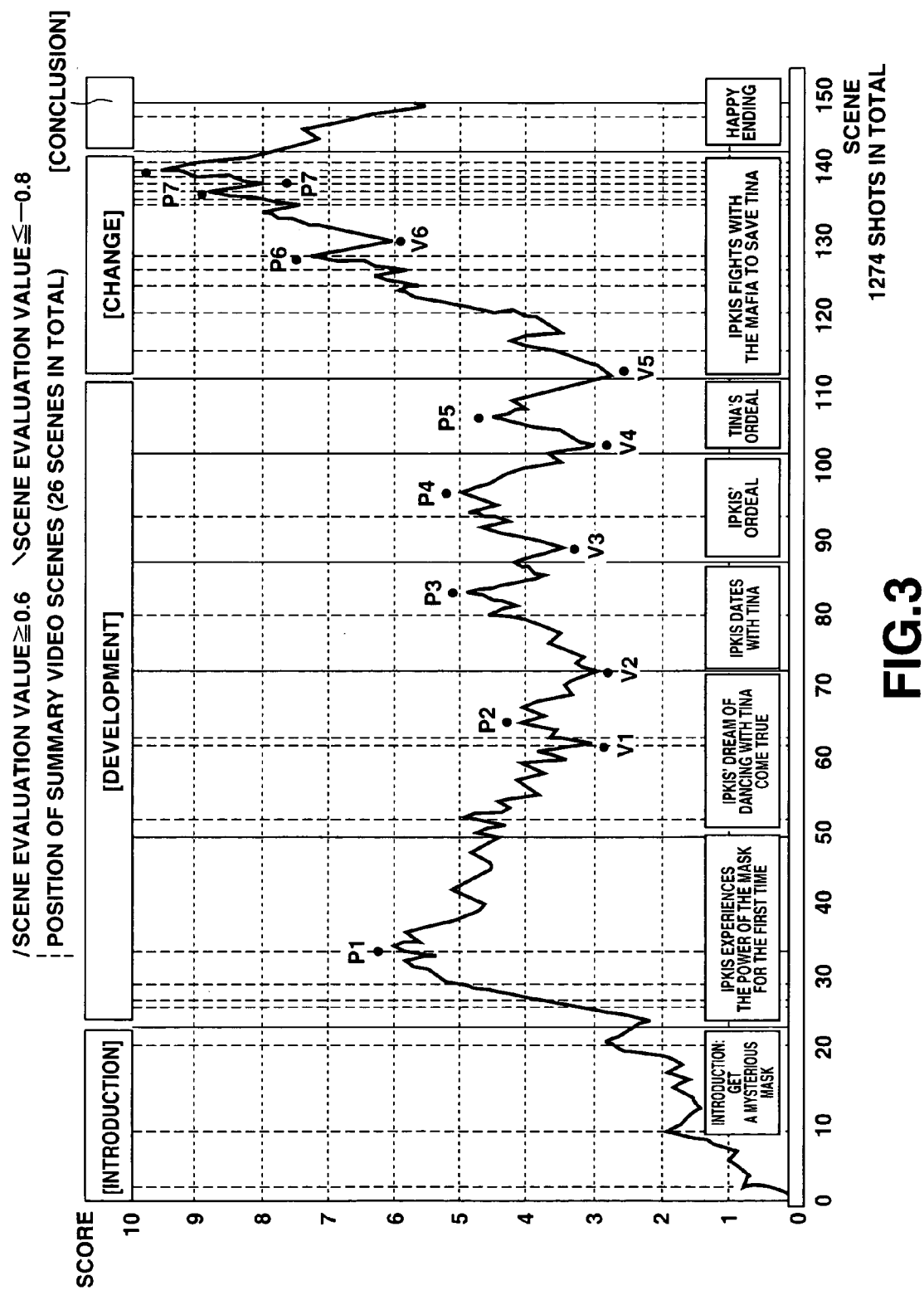
FIG. 3 is a conceptual view illustrating each process of extracted video organization according to the method of the present invention.

FIG. 3 is a conceptual view illustrating each process of extracted video organization.

FIG. 4 shows an example in which the work result is produced in the a semantic score organization process.

FIG. 5 shows an example in which the work result is produced in a shot score preparation process.

FIG. 6 shows another example in which the work result is produced in the shot score preparation process of the method of the present invention. In FIG. 6, a shot in which the cast (Tina) appears is emphasized as an example of the cast mode.

Figure 7:
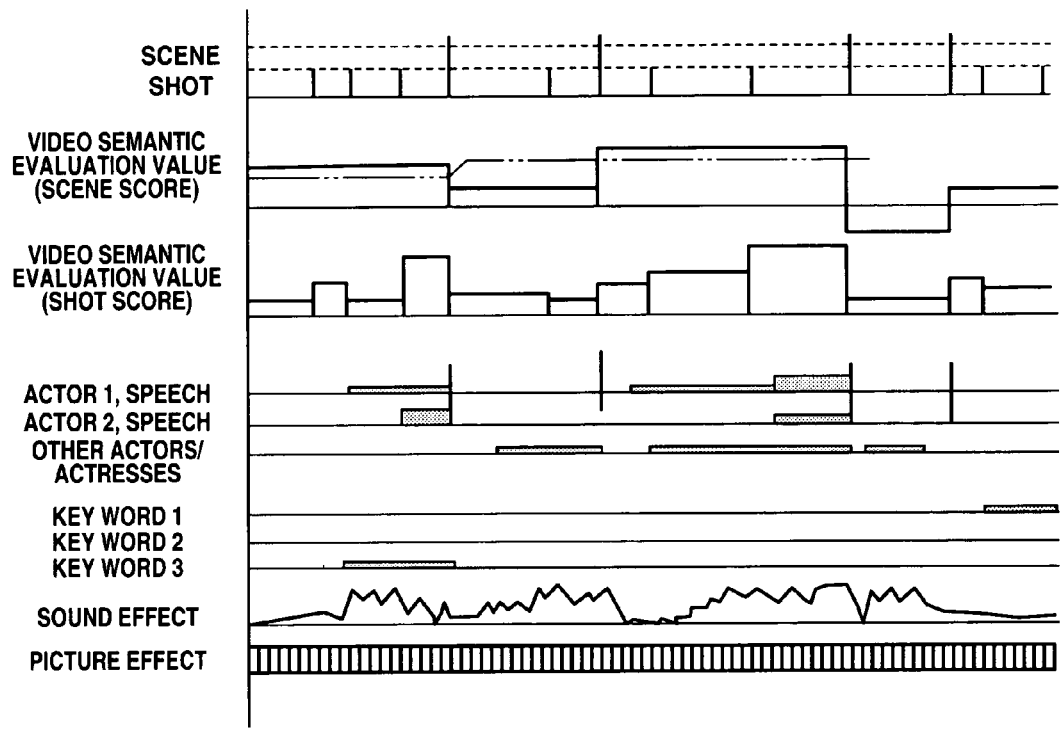
FIG. 7 is an explanatory view showing an exemplary semantic score organized in accordance with the method of the present invention.

FIG. 7 is an explanatory view showing an exemplary semantic score organized in accordance with the method of the present invention.

Hereinafter, each process of the extracted video organization method according to the present embodiment will be described using FIGS. 1 and 2 and also suitably with reference to FIGS. 3 to 7.

As shown in FIG. 1, as soon as the processing starts, it enters the process of setting an initial value and a parameter.

As an initial value of a video compression parameter is inputted in a process Pr1, a default value DT1 of a preset parameter is updated on the basis of the input value in a process Pr2.

The video compression is the processing to extract a part of a regular edition video and organize a short video, particularly, a preview video. The parameter includes a desired video time (e.g., 60 seconds) of the organized short video, a threshold value of a scene evaluation value (or scene score) as a standard for extracting a scene from the regular edition video, a list of main cast (e.g., actors A1, A2, A3 and the like), a condition for a main peak (e.g., peak gap$\geq$0.8), weighting coefficients for video characteristics (e.g., coefficients W1=3 to W8=1 as will be described later), cut seconds, and a cut position.

For example, in the case where a summary video of one to two minutes is to be produced from a movie of two hours, the shots and scenes of the regular edition are too long in time and therefore cannot be used for making many cuts. Most of commercial previews use cuts of one second or two to three seconds at most. In general, the beginning of a shot often consists of an explanatory or introductory video and the last part often consists of raising or solution of a problem that is most impressive. Therefore, as an algorithm for automatically extracting a summary video from shots and scenes, it is effective to cut out a portion of prescribed seconds from the end.

Thus, in the present invention, as prescribed cut seconds for a video to be cut out from a shot or scene video, a threshold value of a scene at a peak, a threshold value of an upward slope toward the peak, and a threshold value of a downward slope from the peak, or a threshold value with a positive scene score and a threshold value with a negative scene score, are designated as different seconds.

A scene evaluation (scoring) method is a video semantic evaluation method. For example, a scene representing the complication of the story has a (+) value and a scene representing the tranquillization has a (−) value, with the degree represented by 10 stages of absolute values 0.1 to 1.0. The complication means the occurrence of a new problem and the rise of psychological complications of the characters as a result thereof. The tranquillization means the solution of the problem and the psychological release and catharsis of the characters as a result thereof.

The threshold value of the scene score will now be described further in detail. Most of the previews of movies and television programs show the scenes representing the complications such as the occurrence of a problem and the development of a new situation or new human relations so as to appeal to the viewers, but do not show the scenes representing the tranquillization such as the solution of the problem and the conclusion. Therefore, as default threshold values for scene selection, a scene evaluation value F(+) reflecting a complication scene is set to F(+)$\geq$0.6 and a scene evaluation value F(−) reflecting a tranquillization scene is set to F(−)$\leq$−0.8.

In the case of a movie or a television program, the explanation of the situation of the story or the beginning of the drama is casually provided in the introductory portion. Therefore, the default threshold value of the introductory portion is lowered by 0.1 point, so that the scene evaluation value F(+) reflecting a complication scene is set to F(+)$\geq$0.5 while the scene evaluation value F(−) reflecting a tranquillization scene is set to F(−)$\leq$−0.7.

In this manner, desired parameters can be set in the process Pr2 prior to the execution of the video extraction processing. Modification and update of these parameters are made possible by the progress of the organization work, as will be described later.

In the subsequent process Pr3, a compression mode is selected. The compression mode is a mode in which a short film organized by extraction as described above, particularly a preview video, is organized to have a structure corresponding to the purpose. There are an outline mode, a highlight mode, a cast mode and the like.

As the mode is selected, rules to be applied to the mode are set in the subsequent process Pr4. The rules are made in two steps corresponding to the above-described two-step screening. The first step includes a condition for selecting scenes to be extracted from the regular edition video, and the second step includes a condition for selecting a shot of a plurality of shots constituting each of the extracted scenes. These rules are set for each mode. The update of the rules are made possible by the progress of the organization work, as will be described later.

The rules will now be described. An outline rule is set for a mode for following the story so as to enable easy understanding of the outline. To realize this, as a condition for selecting scenes to be extracted, complication scenes corresponding to the scene evaluation value F(+)$\geq$0.5 and tranquillization scenes corresponding to the threshold value, F(−)$\leq$−0.7 are selected in the introductory portion (US1), and complication scenes corresponding to the scene evaluation value F(+)$\geq$0.6 and tranquillization scenes corresponding to the threshold value, F(−)$\leq$−0.8 are selected in the subsequent portion.

As a condition for selecting shots in accordance with the outline rule, the following is applied as a shot score Sht, which is a standard therefor.

$$Sht=3\times A+2\times B+2\times C+2\times D+E+F+G+H$$

A to H are items which will be described later. The coefficients multiplied by A to H are the above-described weighting coefficients W1 to W8 for video characteristics.

Then, a shot having the maximum shot score Sht is selected, or a shot is selected on the basis of a sub-rule as will be described later.

The highlight rule is set for a mode for handling a highlight video mainly including the climax of the episode. To realize this, the magnitude of the episode Ep is used as a rise value of an integration value of the scene score from a valley to a peak, and among all the scenes contained in the upward slope and one scene immediately after that, in Ep1 having the first ranking of Ep, Ep2 of the second ranking, and Ep3 of the third ranking, and all the scenes in the upward slope (USz) toward the final peak (Pz) and one scene immediately after that, complication scenes corresponding to the scene evaluation value F(+)≧0.7 and tranquillization scenes corresponding to the threshold value F(−)≦−0.8 are selected. If USz is included in Ep1, Ep2 or Ep3, Ep4 is added to carry out similar processing.

As a condition for selecting shots, the following is applied as a shot score Sht, which is a standard therefor.

$$Sht=3\times A+2\times B+2\times C+2\times D+E+F+G+H$$

Then, a shot having the maximum shot score Sht is selected, or a shot is selected on the basis of a sub-rule as will be described later.

The cast rule is set for a mode in which the main cast is paid attention to. For example, up to three actors/actresses can be designated as the main cast, and if the designated main cast is A1, the foregoing threshold values set for scene extraction in the introductory portion and the general portion are applied for scene selection. As a shot score Sht to be a standard for shot selection, the following is applied.

$$Sht=3\times A1+2\times B+2\times C+2\times D+E+F+G+H$$

In this manner, only the shot in which the cast A1 appears is weighted (W1=3) and the other main cast is regarded as general cast (W1=1). Then, a shot having the maximum shot score Sht is selected, or a shot is selected on the basis of a sub-rule as will be described later.

With respect to the main cast who appears in a small number of scenes, the threshold value is lowered by 0.1.

On completion of the initial setting as described above, the processing starts.

The process Pr5 and the subsequent processes are automatic resolution processes for shots and scenes. In the present embodiment shown in FIG. 1, an automatic resolution method for automatically carrying out shot delimitation is employed. However, the present invention is not limited to such a method, and it is also effective for an operator to arbitrarily set desired delimitation for shot resolution, as will be described later in an embodiment of the device.

The automatic detection process is started in the process Pr5, and shots are automatically detected from regular edition video data (in accordance with the MPEG1 or MPEG2 standard) DT2 in the process Pr6. From the result of detection, a shot index table is produced in the process Pr7. In this shot index table, the shot number and the time codes of the start and end points of the shot are stored.

As a tool for automatic resolution of a video title into shots, for example, application software Slipclip which applies MPEG picture processing may be employed. By processing the 95-minute movie title "MASK" for example using this software, 1274 shots (index) are obtained as shown in FIGS. 3 and 4.

In the subsequent process Pr8, automatic detection of scenes is carried out. In this process, several continuous scene generated as a result of the above-described automatic resolution are grouped into one scene. A scene index table is produced in the process Pr9. In this scene index table, the scene number, the shot number of the start point of the scene, and the shot number of the end point of the scene are stored corresponding to the time codes.

With respect to this scene resolution, too, by setting flags on the basis of the semantics of the story while watching the video through the foregoing Slipclip, shots can be grouped to organize a scene. In the example of the movie title "MASK", 1274 shots are grouped into 150 scenes as shown in FIGS. 3 and 4.

On completion of the shot and scene resolution as described above, a scene evaluation process for deciding each scene evaluation value, that is, the scene score, is carried out in the process Pr10 and the subsequent processes.

Prior to the processing in the process Pr10, each scene is scored by the operator using specific levels (e.g., 20 levels) in accordance with the semantic importance of the story, and the scoring result is inputted as a provided condition.

As such a scene scoring method carried out by the operator, a Freitak technique may be employed. According to this technique, the score has a sign (+) if the semantics of the scene is toward complication, and the score has a sign (−) if the semantics of the scene is toward tranquillization. The degree of complication and tranquillization is split into 10 levels, respectively, and scoring is made using 21 levels in total, that is, −1.0 to 0.0 and 0.0 to +1.0. The evaluation of complication and tranquillization is carried out by the operator watching the video, both from the informative aspect, that is, the information about the occurrence of a new problem and the solution thereof, and from the psychological aspect, that is, the increase in the psychological tension due to complication and the psychological release or catharsis due to tranquillization.

The scoring and evaluation may be carried out by another technique.

When the above-described scoring result is inputted from outside as a provided condition in the process Pr10, it is used as the scene score of the corresponding scene in the process Pr11. Then, a scene score table (FIG. 4) is organized. In the scene score table, each scene number and the scene score of each scene are stored correspondingly.

As the scene score table is thus organized, the processing shifts to FIG. 2 and the production of a video transition characteristic graph and associated data is carried out in the process Pr12.

First, an integration value of the scene score along with the transition of the scene is calculated with reference to the scene score table. On the assumption that the scene score of the n-th scene is Sc(n), the integration value F(n) of the scene score at the n-th scene is expressed by the following recursion formula.

$$F(n)=Sc(n)+F(n-1)$$

In this formula, F(n−1) is the integration value of the scene score up to a scene (n−1). The transition of the integration value F(n) is shown by the numerical value in FIG. 4.

By plotting the transition with the abscissa representing the scene number and with the ordinate representing the integration value, the video transition characteristics area represented in a segmented graph as shown in FIG. 3. This graph is useful for grasping the structure of the story and extracting meaningful scenes. The abscissa may also be a time axis (time code of the end point of the scene).

On the basis of the video transition characteristic graph, calculation of main peaks and valleys, calculation of a rise value from a valley to a peak, determination of main slops including upward slopes and downward slopes, and display of selected scenes are carried out.

In accordance with a predetermined rule, main peaks and main valleys are extracted from the fine peaks and valleys on the graph.

To calculate the main peaks and valleys, a gap value (peak/valley gap value) G is applied on which the above-described initial setting is carried out.

The gap value G generally has the same absolute value on the upward slope and the downward slope. For example, a default value is set to G=0.8 on both the upward and downward slopes.

The default value will now be described.

The main peak Pi (i=1, 2, 3, . . . ) is defined as follows: if, with respect to the integration value in the corresponding scene as a node, there is a rise in the integration value of 0.8 points compared with the integration value in the valley immediately before and the downward slope following the corresponding scene represents a fall having a gap of −0.8 points (that is, the absolute value of the gap reaches 0.8 points), that node is regarded as a main peak Pi.

For the first peak P1, the valley immediately before is the start point. The integration value at the start point is 0.

The main valley Vi (i=1, 2, 3, . . . ) is defined as follows: if, with respect to the integration value in the corresponding scene as a node, there is a fall in the integration value of −0.8 points compared with the integration value in the peak immediately before and the upward slope following the corresponding scene represents a rise having a gap of 0.8 points, that node is regarded as a main valley Vi. The start point is V0.

The gap G may also be set differently for the upward slope and for the downward slope, for example, G=0.6 for the upward slope and G=−0.8 for the downward slope.

In this manner, the main peaks P(i) and the main valleys V(i) are arrayed as V0, P1, V1, P2, V2, . . . , Pn, Vn in the temporal order as shown in FIG. 3. From the trend of these peaks and valleys, the introduction, development (including a plurality of episodes), change, and conclusion of the story can be classified.

An upward slope from V(n−1) to Pn is referred to as USn (Up Slope n) and a downward slope from Pn to Vn is referred to as DSn (Down Slope n).

An episode constituting the story is regarded as being made up of an upward slope USn and a downward slope DSn provided before and after a peak Pn. The magnitude of the episode is measured by the rise value of the upward slope. The magnitude of the episode Ep is expressed by the following equation.

$$Ep = YPn - YV(n-1)$$

In this equation, YV(n−1) is an addition value F(n−1) of the scene score at V(n−1), which is the valley before the present peak, and YPn is an addition value F(n) of the scene score at P(n), which is the present peak.

Then, the main slopes are decided. The main upward slopes are ranked from the one having the greatest rise value. The main downward slopes are ranked from the one having the greatest absolute value of the fall value.

As exemplary default values, the introduction, development, change, and conclusion are considered as follows.

Introduction: US1 (upward slope of the first episode)

Development: DS1 to DS(z−1), with DSz representing the downward slope of the final episode Change: USz (upward slope of the final episode)

Conclusion: DSz (downward slope of the final episode)

The introduction, development, change and conclusion thus automatically detected can be arbitrarily modified by the organizer so as to make the introduction, development, change and conclusion suitably for the purpose and effect. The introduction, development, change and conclusion shown in FIG. 3 are produced as the organizer carries out delimitation and adjustment based on the automatically detected introduction, development, change and conclusion.

In the process Pr13 and the subsequent processes, scenes to be extracted are selected. In accordance with the above-described graph, data and scene score, scenes that meet the scene extraction condition, for example, scenes reaching the threshold value, are extracted and a flag is set to the applied scenes.

As the threshold value, the scene evaluation value $F(+) \geq 0.5$ reflecting the complication and the scene evaluation value $F(-) \leq -0.7$ reflecting the tranquillization are employed as described above in the introductory part (US1), and the scene evaluation value $F(+) z 0.6$ reflecting the complication and the scene evaluation value $F(-) \leq -0.8$ reflecting the tranquillization are employed in the parts except for the introductory part (US1).

It is also possible to set a different threshold value for each area between the peak and the adjacent valley. That is, a threshold value can be set for each peak number and for each valley number, or a threshold value can be set for each upward slope and for each downward slope.

Moreover, a threshold value can be set corresponding to an upward slope from the valley to the adjacent peak or a downward slope from the peak to the adjacent valley.

In general, the impact of a scene having a negative scene evaluation value reflecting the tranquillization, set on the basis of the semantic transition of the video and provided as a provided condition, is lower than the impact of a scene having a positive scene evaluation value reflecting the complication, of the same absolute value as the negative scene evaluation value. Therefore, it is preferred to set the absolute value of the threshold value employed for the scene evaluation value reflecting the tranquillization, as a value greater than the absolute value of the threshold value employed for the scene evaluation value reflecting the complication.

If only the videos of scenes or peaks of high scores and having high shot scores are extracted and assembled as a summary video, the cuts of strong impact stand side by side to generate an unexpected montage effect, thereby producing a flow of video that may cause misunderstanding. In order to prevent this, a summary video of a natural flow can be produced by extracting and adding a scene of a low score from the valley substantially corresponding to the turning point of the episode. At least the unnatural montage effect can be reduced.

From a valley to another valley, associated videos continue as one episode. Therefore, a positive montage effect can often be obtained by continuous videos of high densities, which are shots meeting the following conditions:

A: the main cast appears;

B: there is a speech;

C: exclamation, loud voice, explosion and other sound effects are emphasized; and D: the characters are in bust shots.

Thus, in the present invention, one shot which has a semantic score of an absolute value not higher than the threshold value and does not contain a specific video characteristic is extracted from a scene of a valley or a scene closest to the valley (at the same distance from the valley, the scene on the upward slope is preferentially employed), and assembling is carried out in the temporal order of the regular edition.

The semantic score is importance meta information to be used for retrieval and browsing of various summary videos and important parts of the regular edition video. The scoring thereof can be made by an individual who knows the contents well. However, in order to produce more reliable data, it is desired to find a total score representing the contents from the evaluation by a plurality of evaluators. The evaluators may be a group of people related to the production of the contents, or may be a group of specified monitors representing the viewers.

The semantic score of a story complication scene is positive and that of a tranquillization scene is negative with the degree expressed by values 0 to 1.0. Therefore, in the case of the semantic scores with different signs, the simple average thereof is close to 0 even with respect to the scenes having large absolute values, and the impact of the scenes cannot be reflected accurately.

Thus, a total scene score is generated from a plurality of scene scores. The magnitude of the value is found by averaging the absolute values, and the sign is determined by the majority of signs of samples.

Specifically, if there are plural sets of effective scene scores, the magnitude of the total scene score is defined as $$\left(\sum_{i=1}^{n} \text{ABS}(Si)\right) \Big/ n$$

where n represents the number of samples and S represents the scene score of each sample.

The sign of the total scene score is determined by the majority of signs of the n samples.

If the number of both signs are equal, the sum of positive group values and the sum of negative group value are compared, and the sign of the greater sum is employed as the sign of the total scene score.

If both sums are equal, the total scene score is 0.

It is also possible to decide the magnitude and the sign at the same time by the simple average and to decide scene to be extracted in consideration of the magnitude of dispersion. In such a case, however, the shape of the semantic graph representing the integration value of the scene score is distorted and the detection of peaks is hindered.

Moreover, for example, in the "change" and "conclusion" parts in the video transition, the core of the story, that is, scenes like disclosure of a true offender in a detective story are shown. These scenes generally have large scene scores and therefore are more likely to be candidate scenes for extraction. However, since the disclosure of there scenes in a preview video largely reduces the viewers' will to see the regular edition video, it is preferred to intentionally exclude such core scenes.

Therefore, in the "change" and "conclusion" parts, it is preferred to change or adjust the parameter to further restrict the threshold value, or to separately check the conformity of the scenes to be extracted.

As the scenes to be extracted are automatically selected in accordance with the parameter and rule, these extracted scenes can be automatically displayed on the graph of FIG. 3, with emphasis and modification performed on the extracted scenes, for example, by vertical lines.

The extracted scenes are thus specified by the above-described processes. Then, with respect to each of these extracted scenes, shots to be applied are selected in the process Pr17 and the subsequent processes.

Prior to the processing in the process Pr17, in the process Pr15, whether each shot has each video characteristic item is checked by the operator and the check result is inputted as a provided condition to the process Pr16.

An example of such item check carried out by the operator will now be described.

As video characteristic items of each shot, the following items A to H are employed.

A: The main cast appears (any of the leading and supporting actors/actresses A1, A2, A3 selected in advance appears). Default value for weighting=3

B: There is a speech. Default value for weighting=2

C: Exclamation, loud voice, explosion and other sound effects are emphasized. Default value for weighting=2

D: The background music becomes exciting. Default value for weighting=2

E: There are other cast. Default value for weighting=1

F: The characters are in bust shots or greater shots. Default value for weighting=1

G: There are intense screen changes. Default value for weighting=1

H: There are special picture effects such as SFX or flash. Default value for weighting=1

In the case where the above-described work is manually carried out, the presence/absence of the video characteristics is scored by 1 or 0, which is then written on a template prepared in advance in spread-sheet software, while watching the video through the above-described Slipclip. In this manner, the presence/absence of the items A to H contributing to the video effects is checked for all the shots constituting the extracted scenes, and the information about the presence/absence is inputted from outside as a provided condition.

In the process Pr16, tables as shown in FIGS. 5 and 6 are prepared on the basis of the provided check result, and the shot score is calculated for each shot.

FIG. 5 shows an exemplary shot score of the scene selected in accordance with the outline mode. FIG. 6 shows an exemplary shot score in accordance with the cast mode. A shot in which the main cast (Tina) appears is emphasized by meshes.

The shot score is obtained by multiplying the video characteristics by the provided weighting coefficients W1 to W8 in accordance with the presence/absence information of the items A to H and integrating the multiplication result.

For example, in the case of an outline preview, the shot score Shc is calculated by the following equation.

$$Shc = 3 \times A + 2 \times B + 2 \times C + 2 \times D + E + F + G + H$$

The confirmation of the items A to H and the calculation of the shot score Shc carried out in the process Pr16 can be automatically carried out using the logical processing function of the microcomputer, by reading out the tables shown in FIGS. 5 and 6 that are provisionally prepared and the corresponding weighting coefficients W1 to W8, then causing the tables and weighting coefficients to correspond to one another and then carrying out arithmetic processing.

In the above-described manner, the shot score of each shot is produced.

In the above description, the scoring for the presence/absence of the items A to H of each shot from the regular edition video is carried out by the operator and is inputted from outside as a provided condition. However, the present invention is not limited to this and it is also possible to automate the scoring for the presence/absence of the items.

For example, the scoring for the presence/absence of the item A, that is, whether the main cast appears, and the presence/absence of the item B, that is, whether there is a speech, can be automated by automatically detecting the generation of a sound level not lower than a threshold value from an audio channel of the regular edition video, in which the speech sound of the leading and supporting actors/actresses A1, A2, A3 selected in advance is independently recorded.

Such recording can be easily prepared particularly in the stand-in and lip synchronization for foreign movies.

Similarly, the scoring for the presence/absence of the item C, that is, whether the sound effects are emphasized, can be automated by automatically detecting the generation of a sound level not lower than a threshold value from the audio channel.

In addition, automatic recognition and evaluation of the presence/absence of special video effects is made possible by a picture recognition technique.

Therefore, the process Pr15 in the present embodiment includes not only the input of the provided conditions by the external operator but also the automatic execution of scoring of the items. In the present embodiment, the shot score calculation process in the process Pr16 is automatically executed using the logical processing function of the microcomputer as described above.

It is preferred in terms of efficiency that the above-described processes from the process of checking whether each shot has each video characteristic item to the shot score calculation process are carried out after the scenes are selected as described above. However, the present invention is not limited this and it is also possible to carry out these processes simultaneously or prior to the scene evaluation process. In such a case, a greater number of shots become processing targets.

In the subsequent process Pr17A, automatic calculation of an optimum shot is carried out. The calculation rule employed in this automatic calculation is the second condition.

As the calculation rule to be employed, the score of each shot in each of the extracted scene is automatically retrieved and the shot having the highest shot score is referred to as the optimum shot. As a sub rule, if there are shots having the same score, the earlier shot is employed. If no shot score is obtained, the leading shot of the scene is employed.

In automatically executing this processing using the logical processing function of the microcomputer, the shot number and shot score of the first shot in the scene are stored to a buffer memory. Even if the shot score has a value of 0, it is stored similarly.

Then, the shot score of the second shot is read out and compared with the shot score of the shot stored in the buffer memory. If the shot score of the second shot is higher than the shot score of the shot stored in the buffer memory, the contents of the buffer memory are updated with the shot number and shot score of the second shot.

On the other hand, if the shot score of the second shot, including the value 0, is equal to or lower than the shot score of the shot stored in the buffer memory, the contents of the buffer memory are not updated. By thus carrying out the retrieval and comparison with respect to all the shots in the scene, the optimum shot is stored in the buffer memory.

As another sub rule, it is also possible to automatically take out a designated number of shots in the order from the shot of the highest shot score in the scene and automatically arrange these shots in the temporal order for predetermined seconds (e.g., two seconds for each shot).

In the subsequent process Pr17B, filtering of an optimum shot section by a specific section segment is carried out.

Specifically, in the process Pr17B, the time of the shot or scene extracted in the process Pr17A is filtered by segment information indicating a specific section that is predetermined separately, thereby extracting a compressed summary video.

As the segment information, information indicating a video section of a portion where a speech exists, detected by video signal analysis or picture analysis for detecting a picture caption part, is effective. This makes it possible to extract only a particularly effective portion as a summary video from among important shots. This segment information can be automatically detected or manually designated in the process of video characteristic evaluation of the shots. For the detection of the portion of a speech by audio signal analysis, a technique for discriminating a video section from a non-video section as described in the Japanese Publication of Unexamined Patent Application No. H10-301593 or a technique for precisely discriminating an audio signal section from a background noise section regardless of the level of the background noise as described in the Japanese Publication of Unexamined Patent Application No. H11-119796 may be employed. Alternatively, the segment information can be taken in as provided condition information obtained in a completely different process.

When the optimum shot with respect to each of the extracted scenes is selected as described above, calculation of compressed video data is carried out in the process Pr18. The calculated values are the number of compressed video shots, the total time of compressed video, and the average shot time.

In the subsequent process Pr19, the total time of compressed video is automatically adjusted.

If the total time of compressed video exceeds the above-described designated desired video time, the threshold values are automatically restricted by 0.1 points in terms of the absolute value in the order from the negative side to the positive side, including that for the introductory part. Then, the shots which are not applicable are excluded in the order of the shots of smaller time codes from DS1, so as to recalculate the total time. The total time is sequentially reduced until it reaches the prescribed time. Finally, the shot in US1 is excluded and the time is automatically adjusted.

Moreover, in this process, shots that are clearly inappropriate for the purpose are deleted or adjusted, of the shots organized by the above-described automatic organization.

By repeating the foregoing processes, automatic adjustment is carried out until the total time of compressed video is matched with the desired video time. Thus, the applied shots are determined.

Then, in the process Pr20, final check of each data is carried out and the data is determined. The various data selected in the foregoing processes are organized as the semantic score.

FIG. 7 shows an exemplary semantic score thus organized. As shown in FIG. 7, the delimitation of each shot or each scene (represented by the time code), the video semantic evaluation value (scene score), video characteristic evaluation value (shot score), the shots where each actor/actress appears (represented by thin lines), the shots where speeches appear (represented by bold lines), the shots where key words appear, the sound effects, and the picture effects are recorded and associated with one another along the transition of the scenes.

Then, in the process Pr21, the videos of the applied shots are sequentially cut out and copied from the regular edition video data DT2 on the basis of the time code of the applied shots determined as described above, thus producing compressed video data DT3.

Finally, in the process Pr22, the compressed video data DT3 is assembled to organize the preview video. The assembling order is basically along the temporal order of the regular edition video.

In order to visually confirm and check the scenes selected for each preview mode, the selected scenes can be emphasized on the segmented graph. In this case, the number of selected scenes, the total time and the average scene time are displayed as associated data.

The assembled preview video is recorded and saved into a recording unit such as a hard disk. The preview video is taken out and utilized on an appropriate medium, when necessary.

According to the method of the present embodiment, both the scene score and the shot score can be produced easily and efficiently. In addition, since the preview video can be edited while confirming the configuration of the story and the position of the preview scene on the video characteristic graph, the appropriate preview video grasping the whole story can be easily produced.

Also, since the first-step screening is carried out by the scene selection and the second-step screening including the examination of the shot score is carried out only with respect to the shots in the screened scene, the number of times of arithmetic processing is reduced, thus enabling quick processing.

By selecting the compression mode, that is, by selecting the preview organization rule corresponding to a desired mode, the preview video corresponding to the purpose such as the outline, highlight, or main cast can be easily produced.

Also, according to the present embodiment, by changing, updating or modifying the parameters and rules during the organization, not at the time of initial setting, the time adjustment of the compressed video and the production of the preview video suitable for the genre characteristics of the title can be carried out, thus enabling flexible production.

An embodiment of the video information editing method according to the present invention will now be described.

Figure 9:
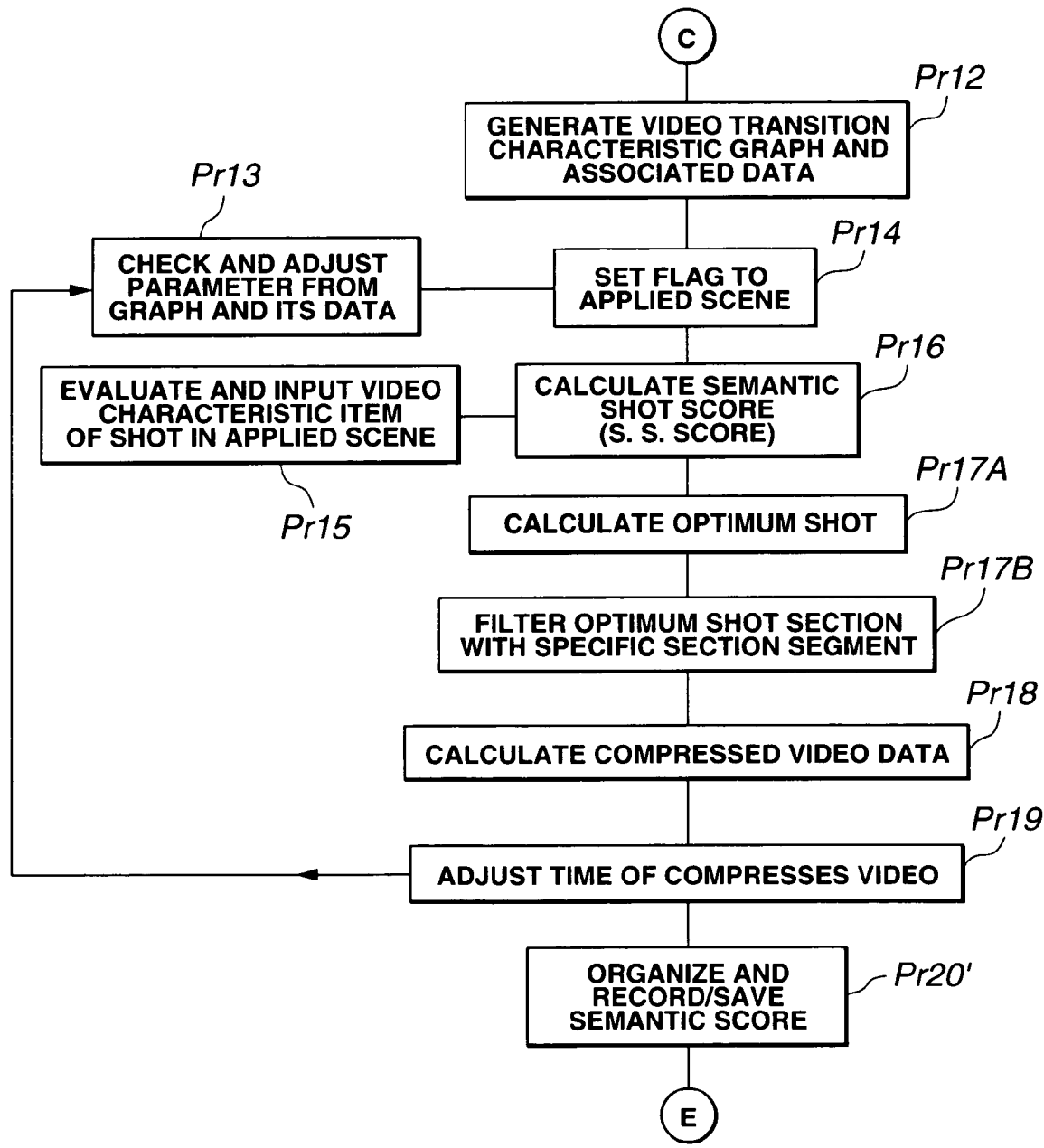
FIG. 9 is an explanatory view illustrating the process of an essential part of an embodiment of the video information editing method according to the present invention.

FIG. 9 is an explanatory view illustrating the process of an essential part of the video information editing method according to the present embodiment.

This video information editing method is characterized by the recording and saving of the semantic score. This method includes the processes Pr1 to Pr19 and the process Pr20'.

The processes Pr1 to Pr19 are similar to those of the above-described embodiment shown in FIGS. 1 and 2 and therefore will not be described further in detail.

In the process Pr20', the data obtained by sampling an externally inputted signal and various identified or selected data, generated or used in the processes before the process Pr20', are organized in the form of a table as the mutually associated semantic score shown in FIG. 7, and there data are recorded and saved. The data are recorded and saved into a magnetic disk unit or the like.

It is possible to read out the recorded and saved semantic score at an arbitrary time point and also to supply the semantic score to the outside.

Thus, the semantic score can be read out at an arbitrary time point and can be used for the semantic score alone.

Another embodiment of the video information editing method according to the present invention will now be described.

Figure 10:
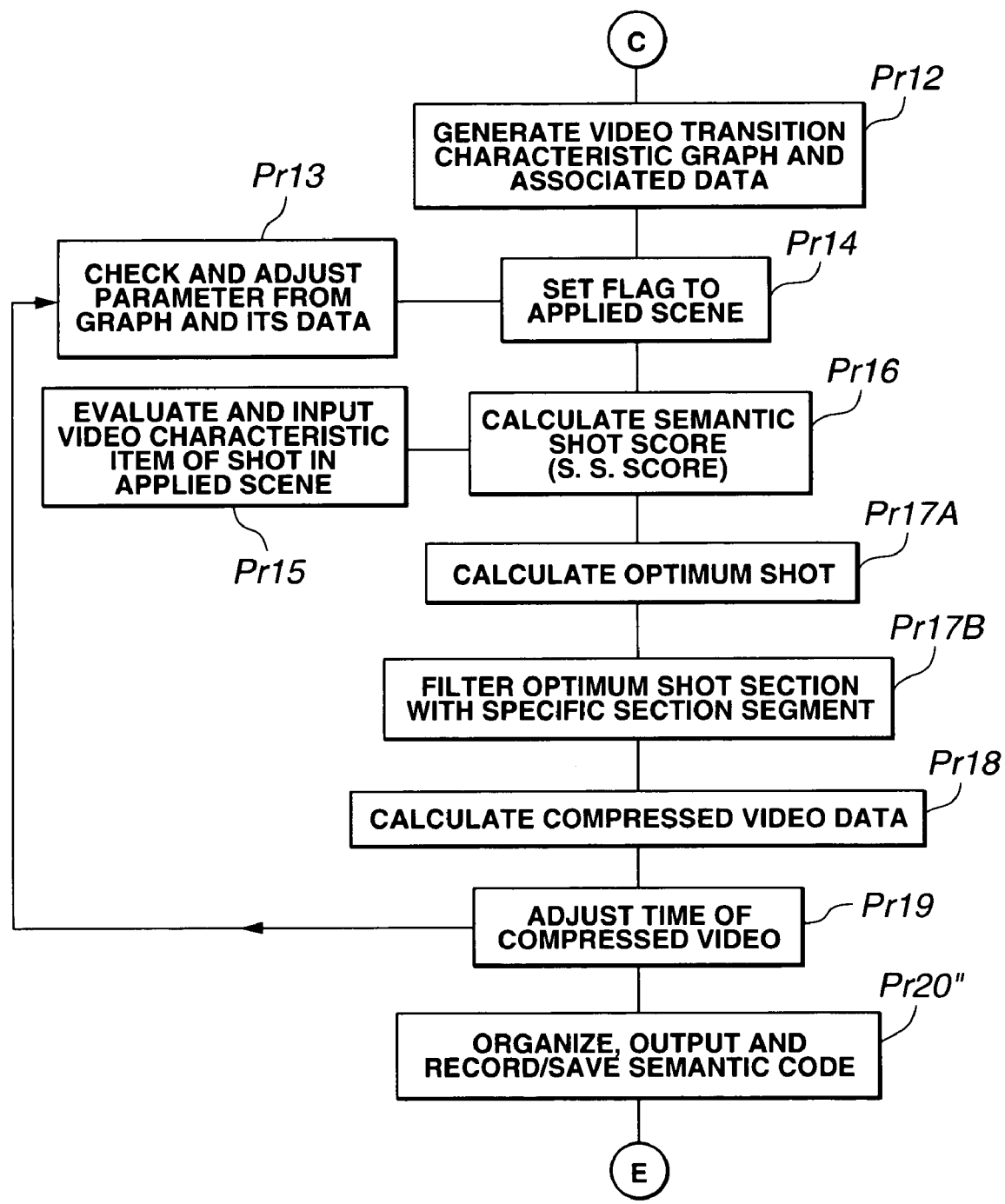
FIG. 10 is an explanatory view illustrating the process of an essential part of another embodiment of the video information editing method according to the present invention.

FIG. 10 is an explanatory view illustrating the process of an essential part of the video information editing method according to the present embodiment. This video information editing method is characterized by the organization, output and recording/saving of the semantic code. The method includes the processes Pr1 to Pr19 and the process Pr20".

The processes Pr1 to Pr19 are similar to those of the above-described embodiment shown in FIGS. 1 and 2 and therefore will not be described further in detail.

In the process Pr20", only the data necessary for organizing the preview video is taken out and coded from the data obtained by sampling an externally inputted signal and various identified or selected data, generated or used in the processes before the process Pr20". Thus, the semantic code is organized.

Figure 8:
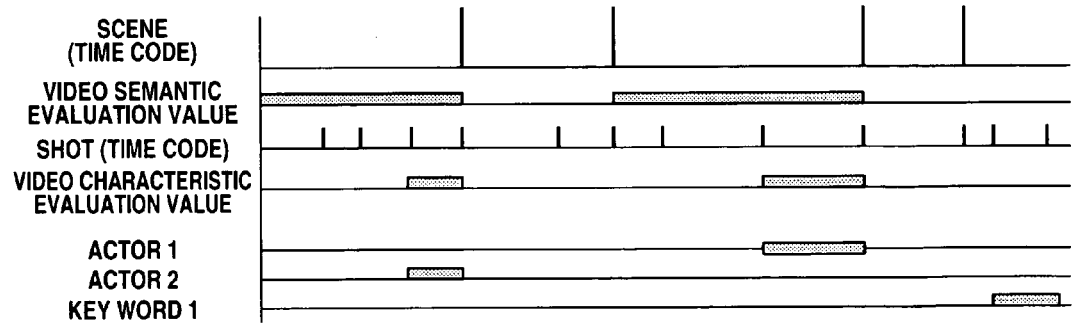
FIG. 8 is an explanatory view showing an exemplary semantic code organized in accordance with the method of the present invention.

In the semantic code, for example, as shown, in FIG. 8, the data such as the video semantic evaluation value (scene score) only with respect to the extracted scenes, and the video characteristic evaluation value (shot score), the delimitation by the time code, the shots where each actor/actress appears and the shots where key words appear only with respect to the applied shots, are associated with one another and coded along the transition of the scenes.

It is possible to output and supply the semantic code to the outside at an arbitrary time point. Also, by recording and saving the semantic code to appropriate recording means, it is possible to read out the semantic code at an arbitrary time point.

Thus, the semantic code can be outputted at an arbitrary time point or read out for the use only for the semantic code.

Figure 11:
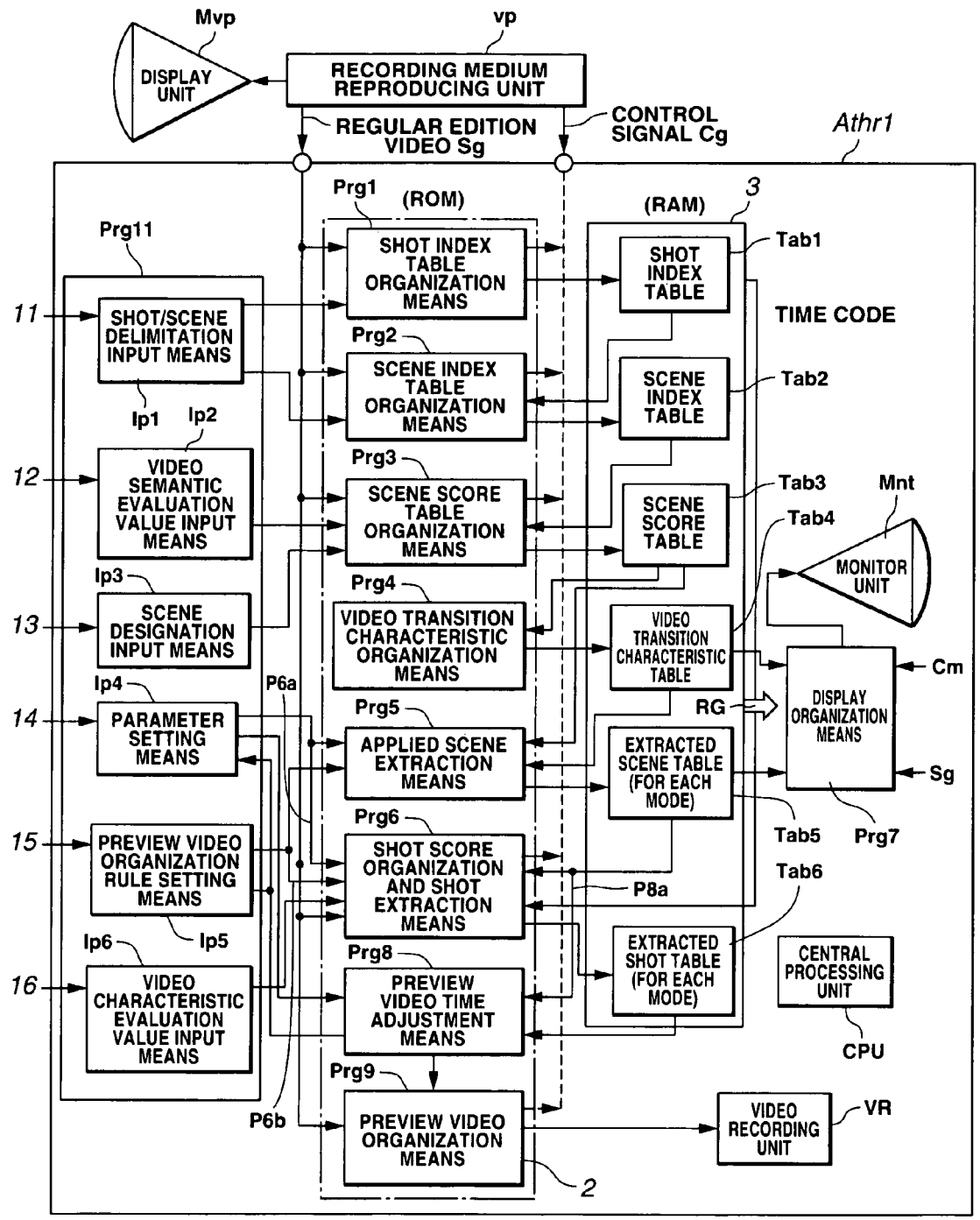
FIG. 11 is a block diagram showing the structure of an embodiment of an extracted video organization device according to the present invention.
Figure 12:
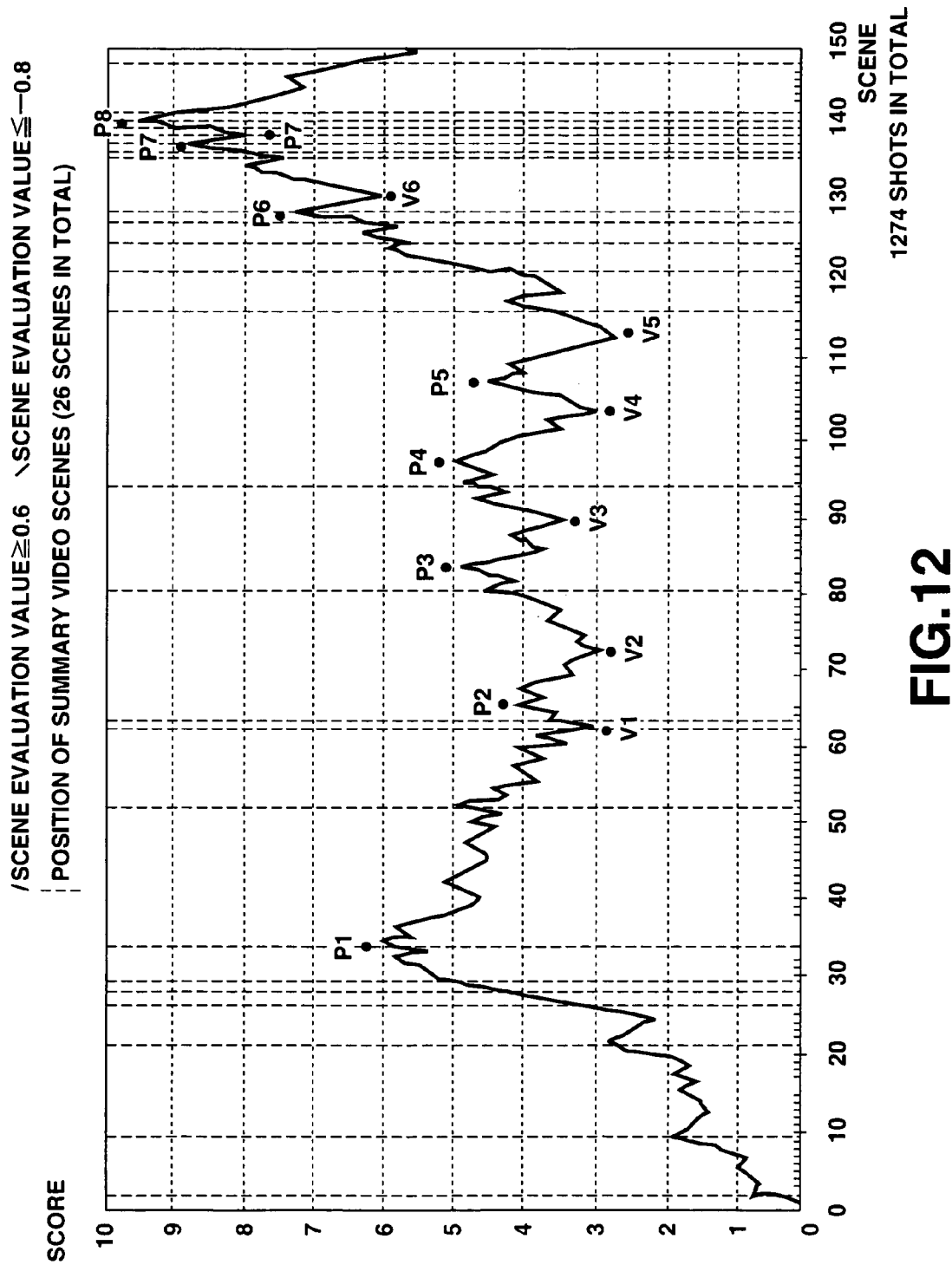
FIG. 12 shows an exemplary video transition characteristic graph displayed on the screen on the basis of a video transition characteristic table of the device of the present invention.

FIG. 11 is a block diagram showing the structure of an embodiment of the extracted video organization device according to the present invention. FIG. 12 shows an exemplary video transition characteristic graph displayed on the screen on the basis of a video transition characteristic table of the device.

As shown in FIG. 11, the extracted video organization device Athr1 according the present embodiment is an authoring device connected with an outside recording medium reproducing unit VP. The extracted video organization device Athr1 has a central processing unit CPU such as a microcomputer, input means Prg11 and display organization means Prg7 which are readable and executable by the central processing unit CPU and mounted for the read-only use in a hybrid semiconductor memory, a recording medium 2 made up of a read-only memory ROM in which a program readable and executable by the central processing unit CPU is stored, a temporary storage unit 3 made up of a semiconductor memory like a DRAM, a monitor unit Mnt for screen display, and a video recording unit VR capable of writing and reading organized preview video signals. In addition, a control circuit, a power-supply circuit and input/output terminals for the whole device are provided but are not shown in the drawing.

The input means Prg11 has shot/scene delimitation input means Ip1, video semantic evaluation value input means Ip2, scene designation input means Ip3, parameter setting means Ip4, preview video organization rule setting means Ip5, and video characteristic evaluation value input means Ip6.

The recording medium 2 is formed in a one-ship structure like a non-volatile semiconductor memory. The recording medium 2 has shot index table organization means Prg1, scene index table organization means Prg2, scene score table organization means Prg3, video transition characteristic organization means Prg4, applied scene extraction means Prg5, shot score organization and shot extraction means Prg6, preview video time adjustment means Prg8, and preview video organization means Prg9, all of which are computer-executed programs.

By executing each of the above-mentioned programs, a shot index table Tab1, a scene index table Tab2, a scene score table Tab3, a video transition characteristic table Tab4, an extracted scene table Tab5, and an extracted shot table 6 are produced in the temporary storage unit 3.

The display organization means Prg7, too, is a computer-executed program but is mounted on a chip different from the recording medium 2. This chip has the display organization means Prg7 mounted thereon and also has a driving circuit for the monitor unit Mnt.

The video recording unit VR is adapted for recording video signals onto a tape- or disk-shaped magnetic recording medium or optical recording medium in a reproducible manner.

The shot/scene delimitation input means Ip1 receives a shot/scene delimitation instruction i1 and transmits the delimitation instruction to the shot index table organization means Prg1 and the scene index table organization means Prg2. The shot/scene delimitation instruction i1 can be automatically inputted as in the previous embodiment, as well as manually inputted.

The video semantic evaluation value input means Ip2 receives a video semantic evaluation value i2 as a provided condition from outside and transmits the evaluation value to the scene score table organization means Prg3.

The scene designation input means Ip3 receives a scene designation input value i3 and transmits the scene designation information to the scene score table organization means Prg3.

The parameter setting means Ip4 receives a parameter setting value i4 and transmits a parameter related to scene selection to the applied scene extraction means Prg5, a parameter related to shot selection to the shot score organization and shot extraction means Prg6, and a preview video time setting value to the preview video time adjustment means Prg8.

The preview video organization rule setting means Ip5 receives a preview video organization rule instruction i5 for each mode and transmits a rule related to scene selection to the applied scene extraction means Prg5 and a rule related to shot selection to the shot score organization and shot extraction means Prg6. The preview video organization rule setting means Ip5 also receives a rule adjustment instruction from the preview video time adjustment means Prg8. The rule adjustment is reflected on the preview video organization rules transmitted to the applied scene extraction means Prg5 and the shot score organization and shot extraction means Prg6.

The video characteristic evaluation value input means Ip6 receives information i6 related to the video characteristic evaluation value or evaluation and transmits the information to the shot score organization and shot extraction means Prg6. The information i6 may be exemplified by the shot evaluation value itself, or the presence/absence information of the video item related to shot evaluation. The information i6 can be automatically inputted as well as manually inputted.

The operation of the extracted video organization device Athr1 will now be described.

First, the video title is resolved into shots and the delimitation information is stored. When the operator skips the title video of the introductory part and the videos of unnecessary parts while reproducing the regular edition video Sg from the recording medium reproducing unit VP and then the video shifts to the part where resolution into shots should be carried out, the operator operates switches, buttons and keys, not shown, to generate the instruction input i1 to start resolution into shots. After that, the operation of each means starts at the shot index table organization means Prg1.

The operation of each means will be described with reference to the attached flowcharts.

Figure 13:
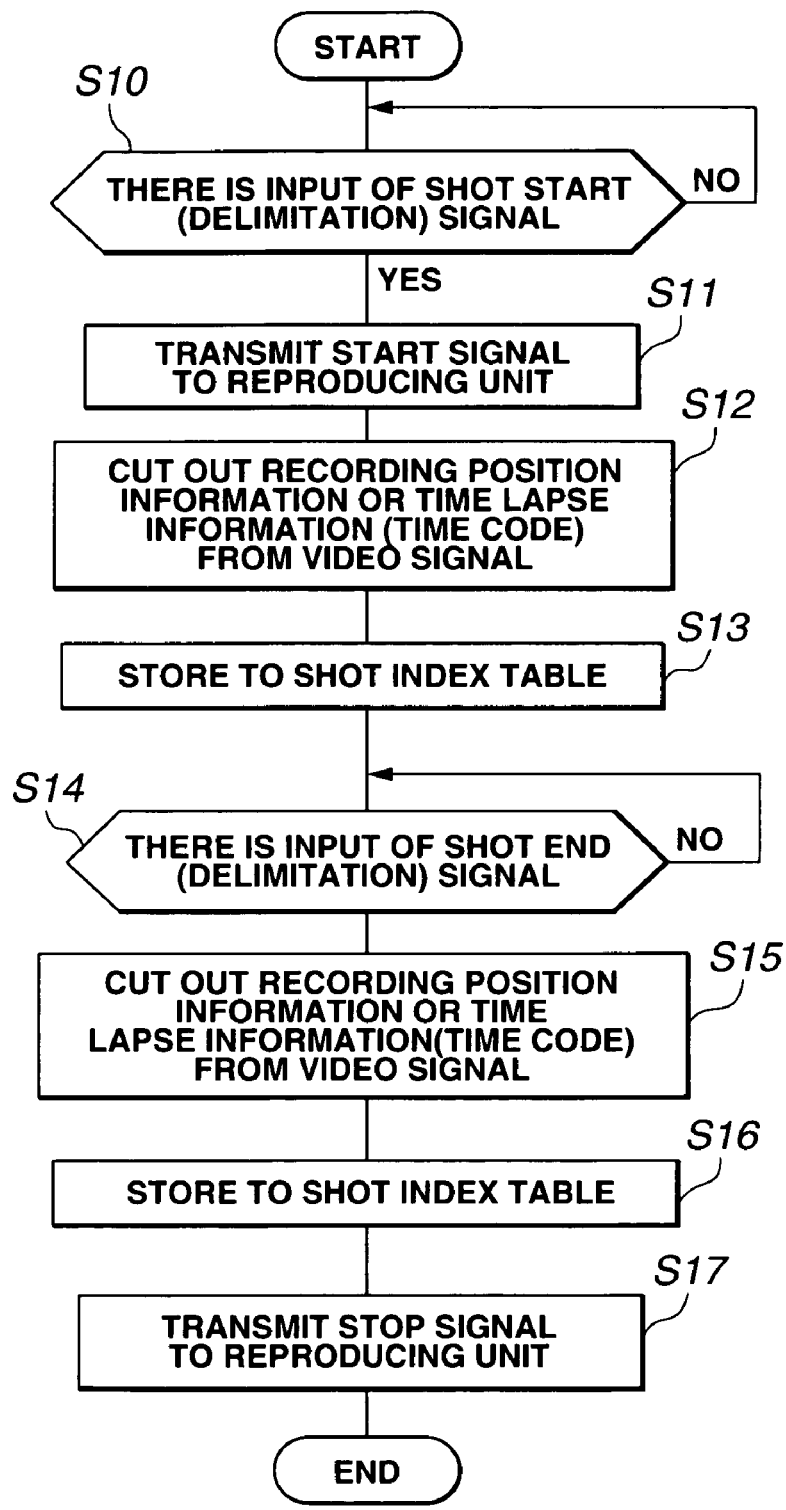
FIG. 13 is a flowchart showing the operation of shot index table organization means shown in FIG. 11.

The shot index table organization means Prg1, on receiving a shot delimitation start instruction from the shot/scene delimitation input means Ip1 (step S10), outputs a control signal Cg to start reproduction to the recording medium reproducing unit VP (step S11), as shown in FIG. 13. The shot index table organization means Prg1 takes in the regular edition video Sg from the recording medium reproducing unit VP and cuts out the time code or the like from the regular edition video Sg at the timing of the shot delimitation instruction (step S12). The shot index table organization means Prg1 stores data of the correspondence between each shot and its time code into the shot index table Tab1 (step S13).

On receiving a shot delimitation end instruction (step S14), the shot index table organization means Prg1 takes in the regular edition video Sg from the recording medium reproducing unit VP and cuts out the time code or the like from the regular edition video Sg at the timing of the shot delimitation instruction (step S15). The shot index table organization means Prg1 stores data of the correspondence between each shot and its time code into the shot index table Tab1 (step S16), and outputs a control signal Cg to stop reproduction to the recording medium reproducing unit VP (step S17).

Figure 14:
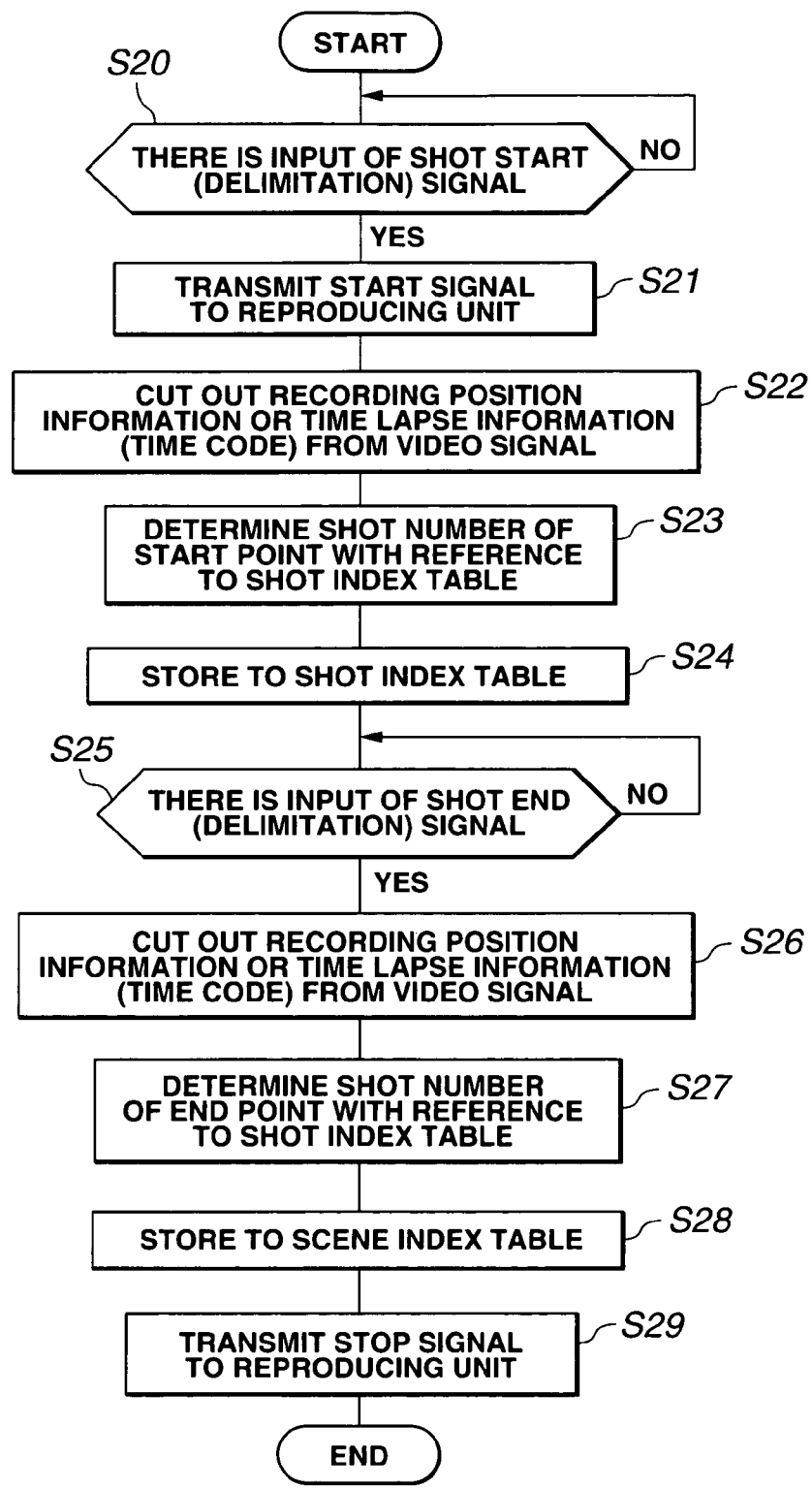
FIG. 14 is a flowchart showing the operation of scene index table organization means shown in FIG. 11.

The scene index table organization means Prg2, on receiving a scene delimitation start instruction from the shot/scene delimitation input means Ip1 (step S20), outputs a control signal Cg to start reproduction to the recording medium reproducing unit VP (step S21), as shown in FIG. 14. The scene index table organization means Prg2 takes in the regular editing video Sg from the recording medium reproducing unit VP and cuts out the current address (i.e., the current time code) (step S22). The scene index table organization means Prg2 takes in the data from the shot index table Tab1 and determines the shot number of the start point constituting this scene with reference to the current address (step S23). The scene index table organization means Prg2 stores information about the correspondence between the shot data with the time code and the scene into the scene index table Tab2 (step S24).

On receiving a scene delimitation end instruction (step S25), the scene index table organization means Prg2 takes in the regular edition video Sg and cuts out the current address (i.e., the current time code) (step S26). The scene index table organization means Prg2 takes in the data from the shot index table Tab1 and determines the shot number of the end point constituting this scene (step S27). The scene index table organization means Prg2 stores information about the correspondence between the shot data with the time code and the scene to the scene index table Tab2 (step S28), and outputs a control signal Cg to stop reproduction to the recording medium reproducing unit VP (step S29).

In the case of the preview video organization by scene extraction alone, the time code or the like is cut out at the timing of the scene delimitation instruction and stored to the scene index table Tab2.

Figure 15:
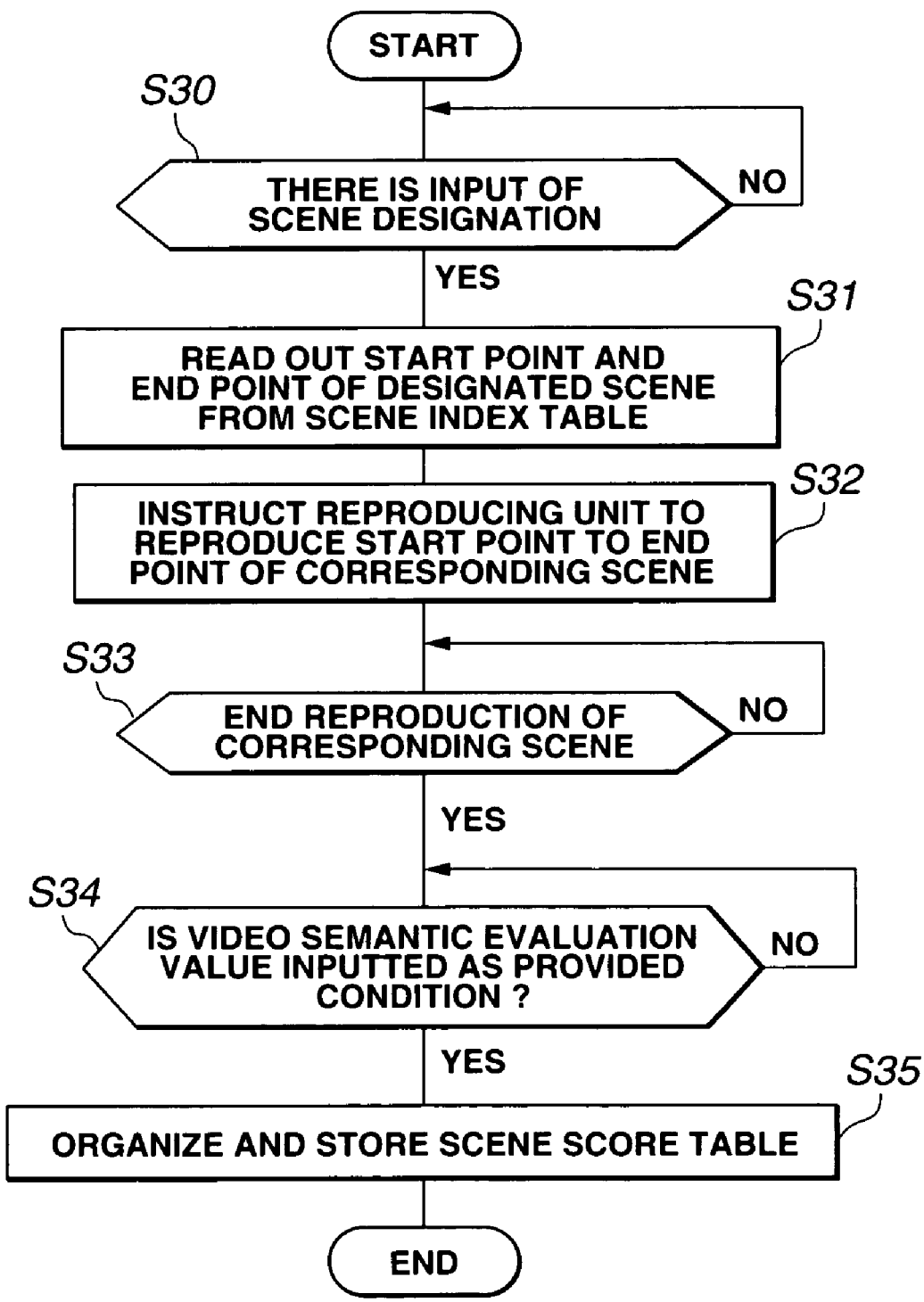
FIG. 15 is a flowchart showing the operation of scene score table organization means shown in FIG. 11.

The scene score table organization means Prg3, on receiving scene designation information from the scene designation input means Ip3 (step S30), reads out the start point and the end point of the designated scene with reference to the scene index table Tab2 (step S31), and outputs a control signal Cg to search for and reproduce the scene to the recording medium reproducing unit VP (step S32), as shown in FIG. 15. On completion of reproduction of this scene (step S33), the scene score table organization means Prg3 receives an evaluation value from the video semantic evaluation value input means Ip2 (step S34) and stores the evaluation value, the scene number, and the shot information constituting the scene to the scene score table Tab3 (step S35).

Figure 16:
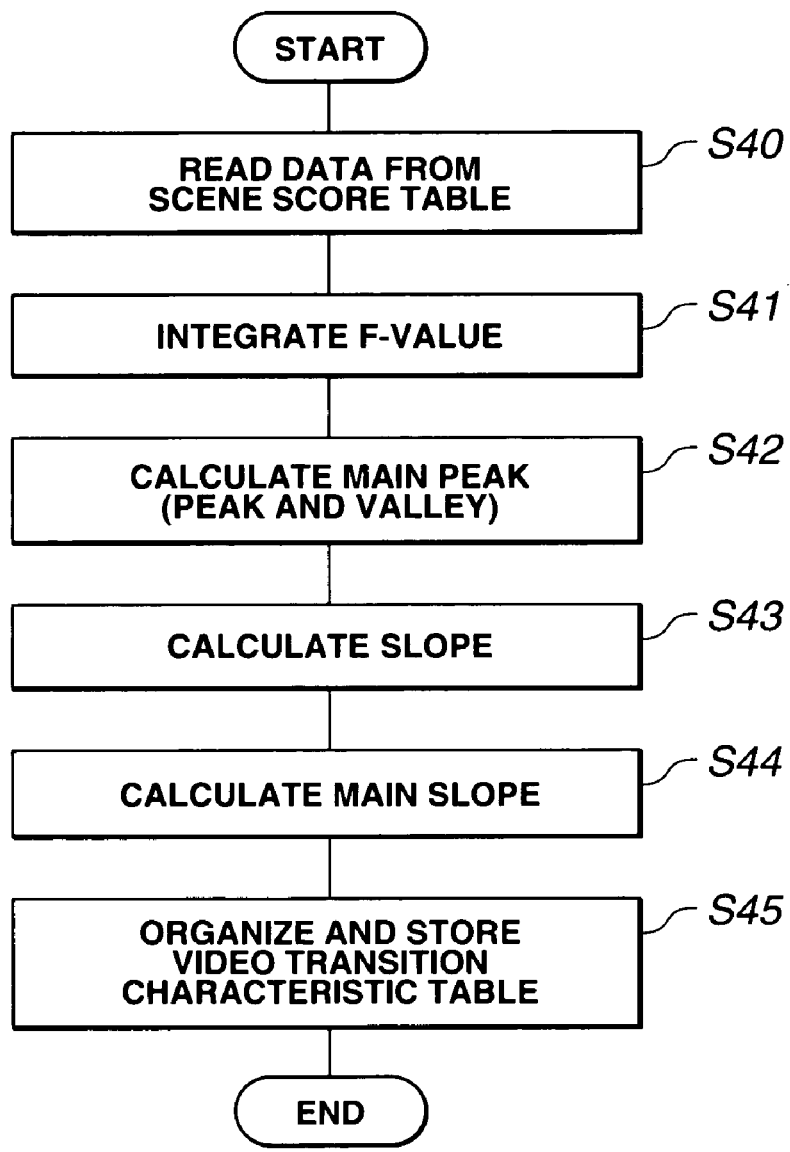
FIG. 16 is a flowchart showing the operation of video transition characteristic organization means shown in FIG. 11.

The video transition characteristic organization means Prg4 reads out the data from the scene score table Tab3 (step S40), integrates the scene score (F-value) (step S41), calculates the main peaks and valleys (step S42), calculates the rise value of slope (step S43), decides the main slope (step S44), and writes these data to the video transition characteristic table Tab4 (step S45), as shown in FIG. 16.

Figure 17:
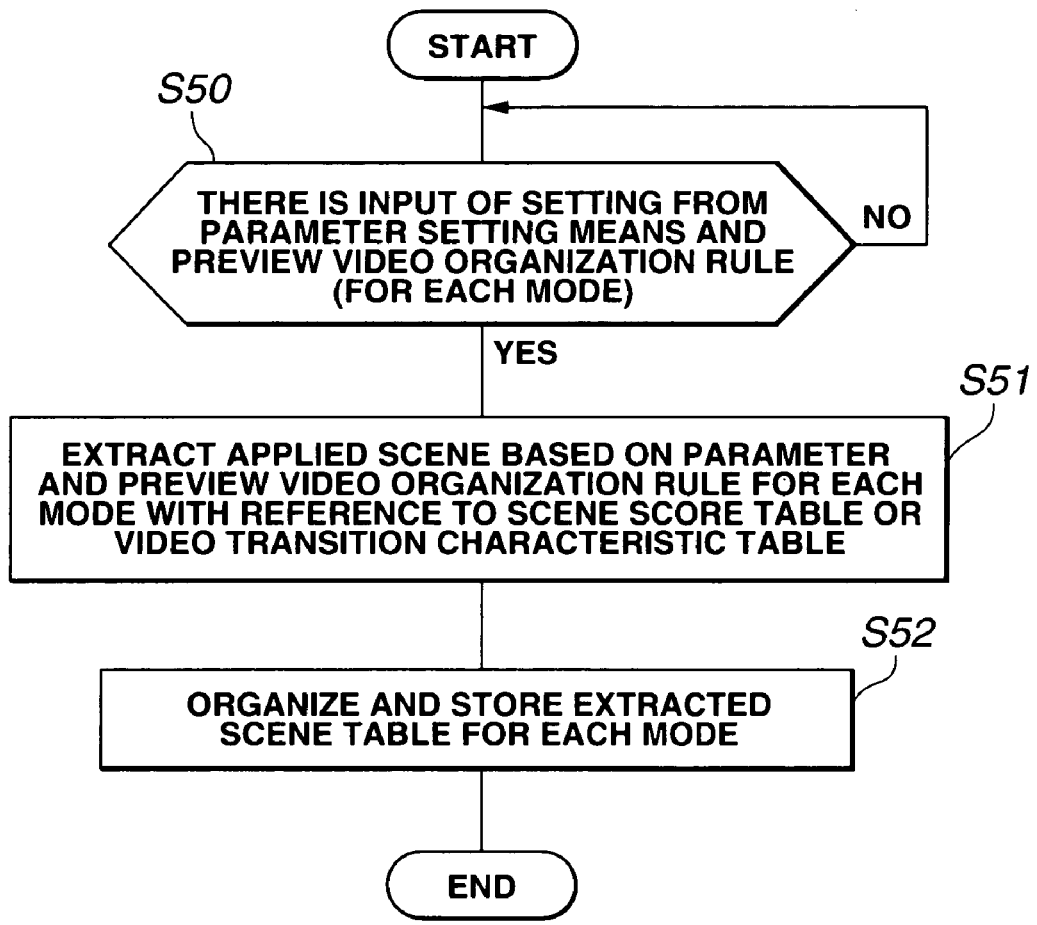
FIG. 17 is a flowchart showing the operation of applied scene extraction means shown in FIG. 11.

The applied scene extraction means Prg5 receives the parameter from the parameter setting means Ip4 and receives the preview video organization rule for each mode from the preview video organization rule setting means Ip5 (step S50), as shown in FIG. 17. The applied scene extraction means Prg5 then takes in the data from the scene score table Tab3 or the video transition characteristic table Tab4 and selects the scene to be extracted (step S51). The applied scene extraction means Prg5 stores the scene number and the shot information constituting this scene to the extracted scene table Tab5 (step S52).

Figure 18:
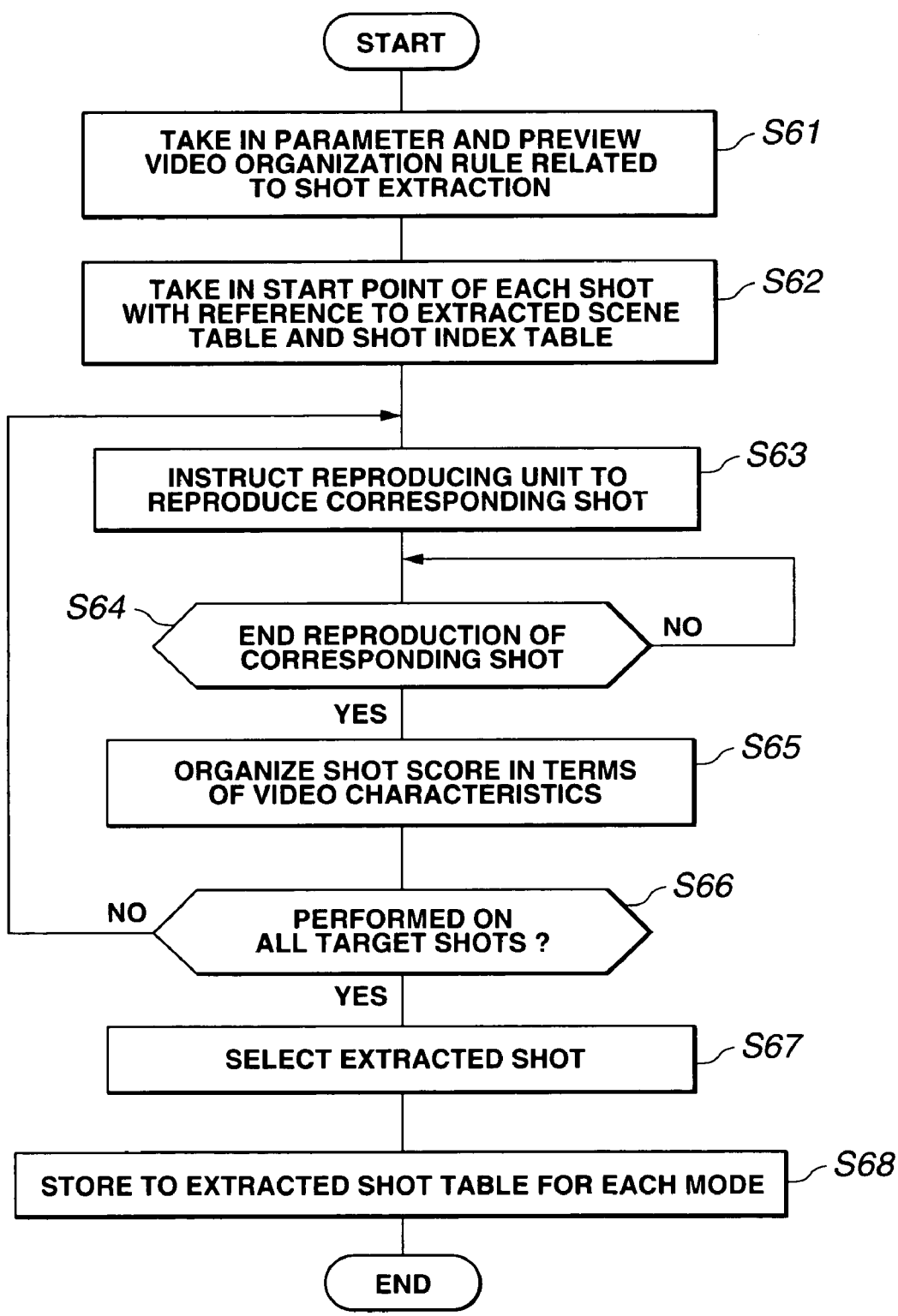
FIG. 18 is a flowchart showing the operation of shot score organization and shot extraction means shown in FIG. 11.

FIG. 18 shows the operation of the shot score organization and shot extraction means Prg6 using two-step screening.

The shot score organization and shot extraction means Prg6 takes in the parameters and rules related to mode designation and shot extraction from the parameter setting means Ip4 and the preview video organization rule setting means Ip5 (step S61). On the basis of the mode designated by the rules taken in, the shot score organization and shot extraction means Prg6 takes in the data of the scene extracted for the mode from the extracted scene table Tab5, then confirms each shot (target shot) constituting the scene, and takes in the time code data of the start point and the end point of one target shot from the shot index table Tab1 (step S62). The shot score organization and shot extraction means Prg6 outputs a control signal Cg to search for and reproduce this shot to the recording medium reproducing unit VP (step S63). On completion of reproduction of this shot (step S64), the shot score organization and shot extraction means Prg6 organizes the video characteristic evaluation value of this shot (step S65), executes the above-described processing with respect to all the target shots (step S66), selects the shot to be extracted from all the target shots (step S67), and stores the extracted shot with the time code to the extracted shot table Tab6 (step S68).

In the above-described operation to determine the video characteristic evaluation value of the shot, the operator provides, from outside, the video characteristic evaluation value itself as the input i6 through the video characteristic evaluation value input means Ip6. If, unlike this, only the presence/absence information of the video characteristic items is provided from outside as in the previous embodiment, a step of calculating the evaluation value based on the presence/absence information may be added.

The processing on the scene alone or the shot alone, other than the two-step screening, will be described later.

Figure 19:
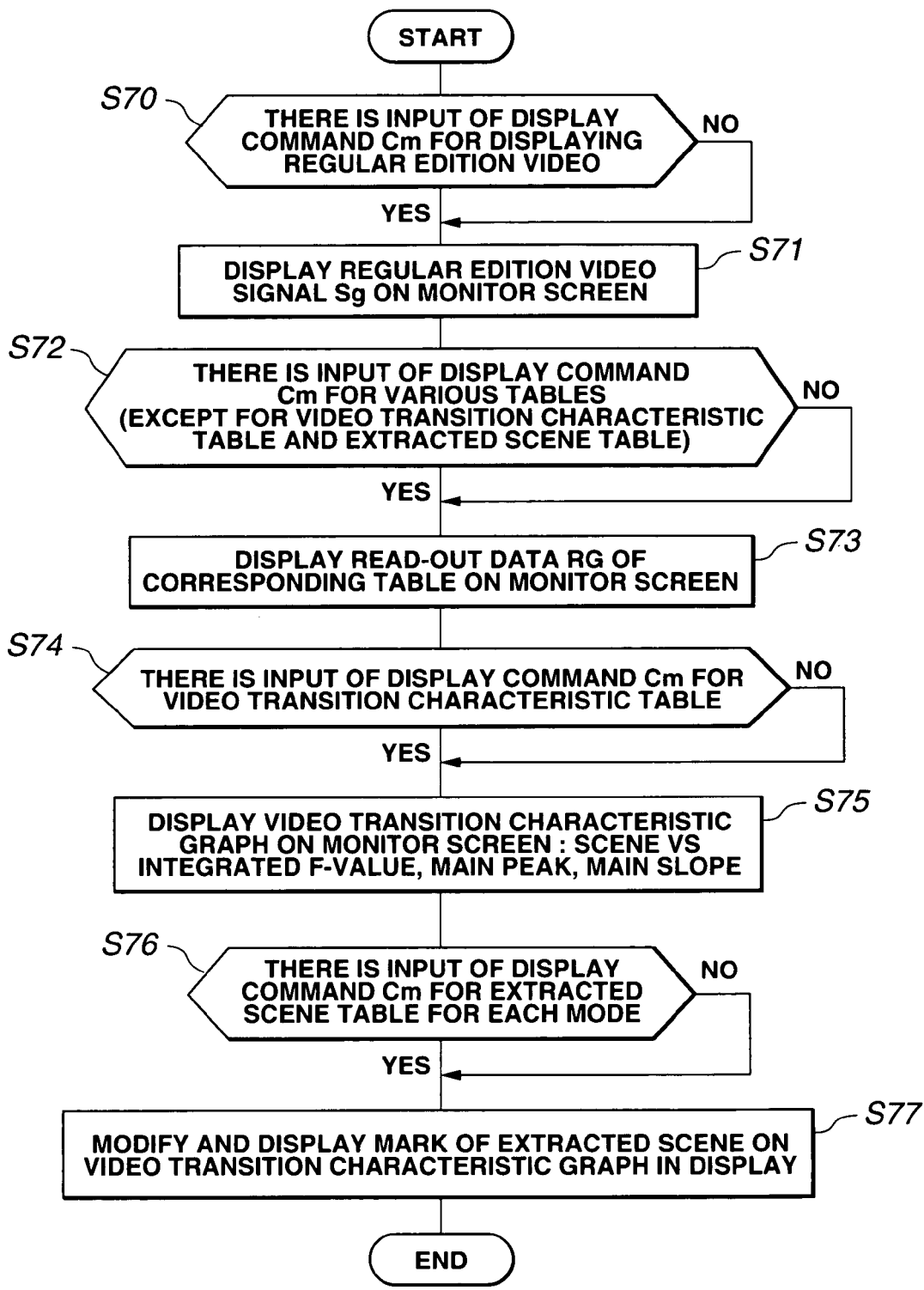
FIG. 19 is a flowchart showing the operation of display organization means shown in FIG. 11.
Figure 20:
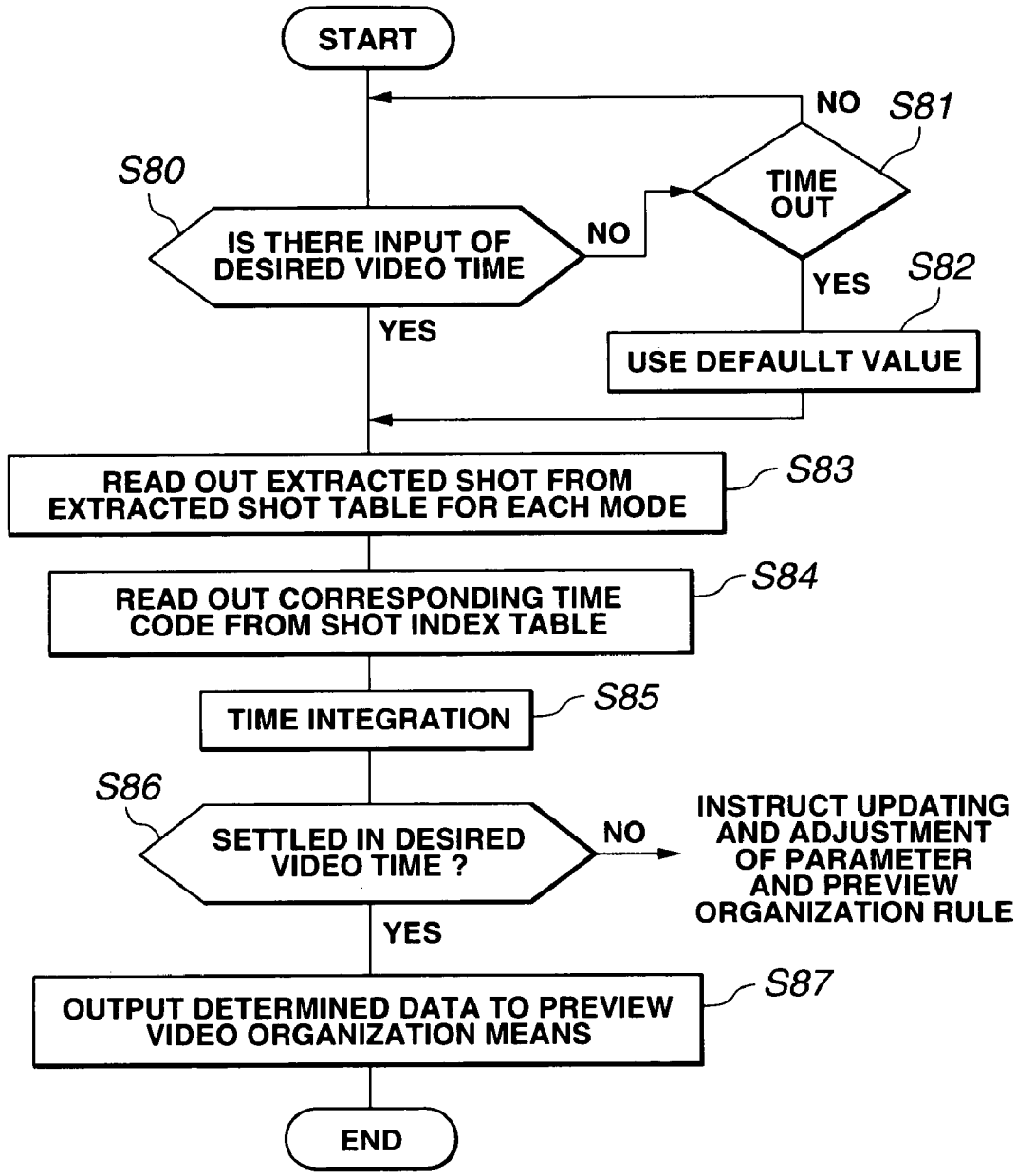
FIG. 20 is a flowchart showing the operation of preview video time adjustment means shown in FIG. 11.

The display organization means Prg7, on receiving a display command Cm instructing the display of the regular edition video Sg (step S70), takes in the regular edition video Sg from the recording medium reproducing unit VP and displays it on the monitor unit Mnt, as shown in FIG. 19.

Also, on receiving display commands Cm for the respective tables except for the video transition characteristic table Tab4 and the extracted scene table Tab5, from the other means Prg1 to Prg6, Prg8, and Prg9 (step S72), the display organization means Prg7 takes in the data RG from the tables Tab1 to Tab3 and Tab6, and displays the data on the monitor unit Mnt (step S73).

On receiving a display command Cm for the video transition characteristic table Tab4 (step S74), the display organization means Prg7 takes in the data from the video transition characteristic table Tab4 and displays a video transition graph shown in FIG. 12 onto the monitor unit Mnt (step S75). The data displayed on the screen includes the integration scene score (F-value) in each scene, the main peaks (peak and valley), and the main slopes (upward slope and downward slope), as shown in FIG. 12.

On receiving a display command Cm for the extracted scene table Tab5 (step S76), the display organization means Prg7 takes in the data of the corresponding mode from the extracted scene table Tab5 and modifies the display of the mark of the extracted scene on the video transition graph shown in FIG. 12 (step S77). In FIG. 12, the color is displayed by a vertical dotted line different from the graph.

The preview video time adjustment means Prg8 waits for the input of a desired video time from the parameter setting means Ip4, and uses the desired video time if there is the input, or uses a default value as the desired video time if there is no input within a predetermined time period (steps S80 to S82). The preview video time adjustment means Prg8 reads out the extracted shot of the corresponding mode from the extracted shot table Tab6 (step S83), reads out the corresponding time code from the shot index table Tab1 (step S84), carries out time integration (step S85), and checks whether the video is settled in the desired video time or not (step S86). If the video is not settled in the desired video time, the preview video time adjustment means Prg8 instructs the parameter setting means Ip4 and the preview video organization rule setting means Ip5 to update and adjust the parameter and the preview video organization rule, respectively. If the video is settled in the desired video time, the preview video time adjustment means Prg8 outputs the determined data with the raking of the extracted shot and with the time codes of the start point and the end point to the preview video organization means Prg9 (step S87).

Figure 21:
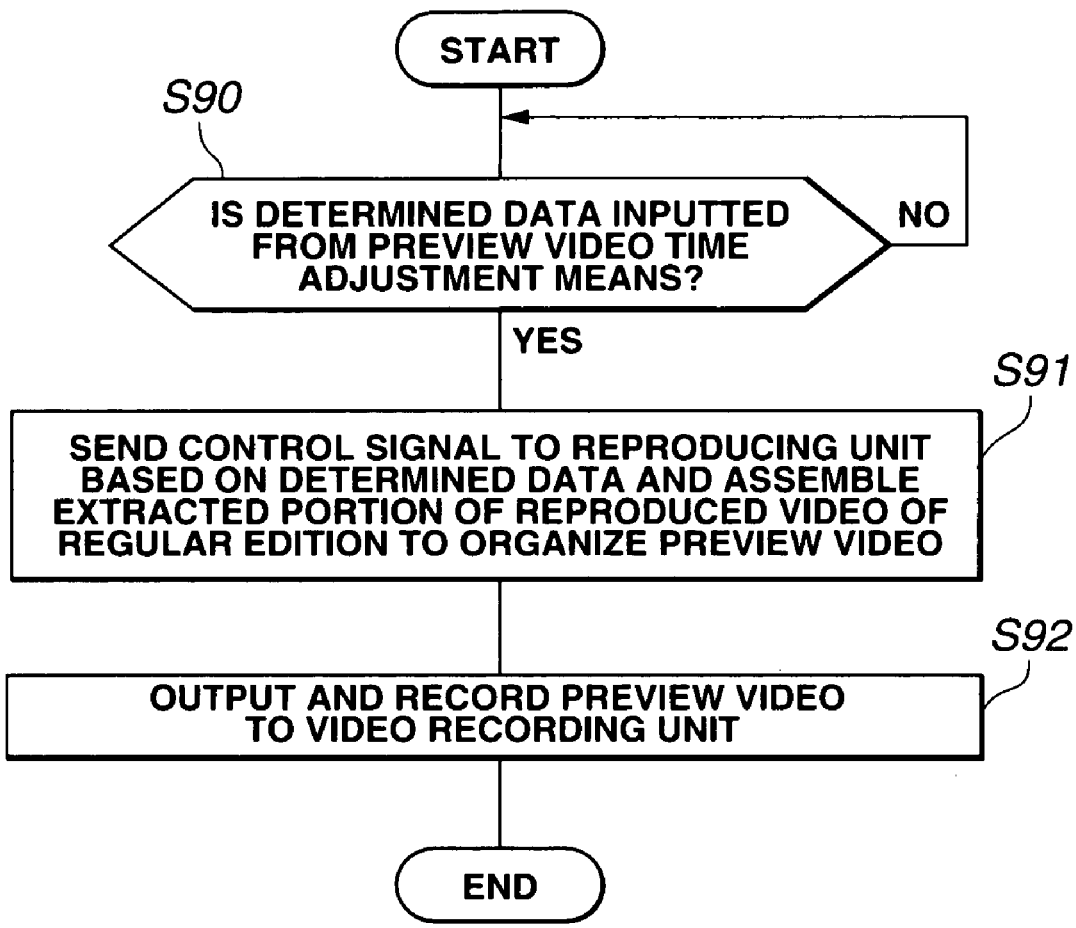
FIG. 21 is a flowchart showing the operation of preview video organization means shown in FIG. 11.

The preview video organization means Prg9 receives the determined data from the preview video time adjustment means Prg8 (step S90), as shown in FIG. 21. On the basis of the determined data, the preview video organization means Prg9 sequentially sends a control signal Cg containing the time codes of the start point and the end point of each shot to the recording medium reproducing unit VP, then takes in the extracted part of the regular edition video reproduced from the recording medium reproducing unit VP, and assembles the extracted part to organize the preview video (step S91). The preview video organization means Prg9 outputs and records the organized preview video signal to the video recording unit VR (step S92).

As the procedure for selecting the scene to be extracted at step S51 by the applied scene extraction means Prg5, a scene such that the scene score under consideration has an absolute value reaching a predetermined threshold value is extracted. Thus, the processing for specifying a scene of a greater effect is facilitated.

As the threshold value in the procedure for selecting the scene to be extracted at step S51 by the applied scene extraction means Prg5, a threshold value may be determined for each area between a peak or valley scene and the adjacent valley or peak scene, where a peak scene is a scene such that the continuous increase of the integration value up to the scene under consideration with respect to the integration value of each scene score along the scene transition exceeds a predetermined first gap value and such that the absolute value of the continuous decrease of the integration value after that scene exceeds a predetermined second gap value, while a valley scene is a scene such that the absolute value of the continuous decrease of the integration value up to the scene under consideration exceeds a predetermined third gap value and such that the continuous increase of the integration value after that scene exceeds a predetermined fourth gap value. Thus, the optimum scene can be extracted for the designated mode. The example of setting the threshold value for each mode is described in detail in the previous embodiment.

Alternatively, as the target scene in selecting the scene to be extracted at step S51 by the applied scene extraction means Prg5, it is possible to consider only the scene located on the upward slope to the peak from the valley immediately before and the scene on the downward slope immediately after the peak, on the basis of the magnitude of the increase in the integration value of the valley scene and the adjacent peak scene after the valley scene, or on the basis of the ranking of the magnitude of the increase in the integration value. Thus, the number of target scenes is limited and efficient selection can be carried out.

In addition, the threshold value in the procedure for selecting the scene to be extracted at step S51 by the applied scene extraction means Prg5 may be set in accordance with the upward slope from the valley to the adjacent peak or the downward slope from the peak to the adjacent valley.

Thus, the scenes to be extracted are not concentrated in a specified part but are employed from the whole video, thus realizing balanced extraction of scenes for the preview video.

Moreover, when each scene score has a positive or negative value, it is effective that the absolute value of the threshold value applied for the positive scene score is made equal to or smaller than the absolute value of the threshold value applied for the negative scene score, with respect to the threshold value in the procedure for selecting the scene to be extracted at step S51 by the applied scene extraction means Prg5, for the reason described in detail in the previous embodiment.

In the procedure for shot score organization carried out at step S64 by the shot score organization and shot extraction means Prg6, as the shot score, it is preferred to add a value obtained by carrying out predetermined weighting on each of the video characteristic items including at least the presence of a speech, the volume of a predetermined level or higher, the appearance of a specified actor/actress, or the special picture effect in the corresponding part of the regular edition video, with respect to each of the items.

Thus, the predetermined weighting can be changed in response to the purpose, and the extraction of the shots suitable for the purpose of the mode can be made effective. Particularly, by employing a greater weighting value on the item related to the appearance of a specified actor/actress than the weighting values on the other items, the extraction of the shots suitable for the purpose of the cast mode can be made effective.

The operation in organizing the preview video using only the extracted scenes will now be described. The regular edition video Sg from the recording medium reproducing unit VP is reproduced and outputted, and the operator inputs a scene delimitation input signal i1 at a position where the operator wants to delimit as a scene while watching the video on the display unit Mvp attached to the recording medium reproducing unit VP or the monitor unit Mnt provided on the present unit. Then, in response to this, the shot/scene delimitation input means Ip1 sends a delimitation instruction to the scene index table organization means Prg2. At this timing, the scene index table organization means Prg2 cuts out the time code and the absolute track address from the regular edition video Sg, and the time code and the absolute track address corresponding to the delimitation are stored into the scene index table Tab2. This operation is continuously carried out with respect to the whole regular edition video, and on completion of reproduction of the regular edition video, a group of time codes delimiting the whole regular edition video into scenes is formed in the scene index table Tab2.

When the overall control means, not shown, detects the end of reproduction of the regular edition video Sg, the scene score table organization means Prg3 is started. The scene score table organization means Prg3 causes the recording medium reproducing unit VP to reproduce the regular edition video by each scene from the first scene with reference to the scene index table Tab2.

When the operator watches the video of one scene and inputs its semantic evaluation value i2 with a key, the semantic evaluation value i2 is inputted to the scene score table organization means Prg3 via the video semantic evaluation value input means Ip2, and the scene score table organization means Prg3 stores the semantic evaluation value i2 together with the time code of the scene to the scene score table Tab3. If the operator wants to input or change the evaluation value of a specified scene, the operator inputs a scene designation i3 for that scene and further inputs an updated evaluation value i2 of the corresponding scene with a key. Thus, the scene designation i3 and the updated evaluation value i2 are sent to the scene score table organization means Prg3 via the scene designation input means Ip3 and the video semantic evaluation value input means Ip2, respectively. On the basis of these designation and evaluation value, the scene score table organization means Prg3 updates the contents of the scene score table Tab3.

Next, when the operator inputs a desired preview video time and a parameter related to scene selection as an input i4 to the parameter setting means Ip4 and inputs a preview video organization rule instruction as an input i5 to the preview video organization rule setting means Ip5, the parameter setting means Ip4 temporarily stores the desired preview video time and sends the parameter related to scene selection and the preview video organization rule instruction to the applied scene extraction means Prg5. The applied scene extraction means Prg5 selects a scene to be extracted on the basis of the parameter and rule with reference to the data in the scene score table Tab3, and stores the extracted scene into the extracted scene table Tab5. The stored contents include the time code. Thus, all the scenes to be extracted are stored.

On completion of the operation by the applied scene extraction means Prg5, the overall control means starts the preview video time adjustment means Prg8 and sends an instruction to the parameter setting means Ip4. The parameter setting means Ip4 inputs the desired preview video time, temporarily stored therein, to the preview video time adjustment means Prg8. The preview video time adjustment means Prg8 sequentially reads out the data P8a of the extracted scenes from the extracted scene table Tab5 and calculates the video time length of all the extracted scenes connected. When the calculated video time length is longer or shorter than the desired preview video time, a modification instruction to restrict or relax the rule is sent to the preview video organization rule setting means Ip5, or a modification instruction to restrict or relax the parameter is sent to the parameter setting means Ip4.

On the basis of the modification, the applied scene extraction means Prg5 re-selects the scenes to be extracted and updates the storage contents of the extracted scene table Tab5. The preview video time adjustment means Prg8 sequentially reads out the data P8a of the updated extracted scenes from the extracted scene table Tab5 and calculates the video time length of all the extracted scenes connected. As the above-described processing is repeated, the data for the preview video in conformity with the desired preview video time is sent to the preview video organization means Prg9.

The preview video organization means Prg9 controls the recording medium reproducing unit VP to reproduce and output the regular edition video, and sequentially records the respective extracted scenes to the video recording unit VR on the basis of the data sent from the preview video time adjustment means Prg8. Thus, the preview video is organized.

The operation in organizing the preview video using only the extracted shots without carrying out the above-described screening with the extracted scenes will now be described.

The regular edition video Sg from the recording medium reproducing unit VP is reproduced and outputted, and the operator inputs a shot delimitation input signal at a position where the operator wants to delimit as a shot while watching the video on the display unit Mvp attached to the recording medium reproducing unit VP or the monitor unit Mnt provided on the present unit. Then, in response to this, the shot/scene delimitation input means Ip1 sends a delimitation instruction to the shot index table organization means Prg1. At this timing, the shot index table organization means Prg1 cuts out the time code and the absolute track address from the regular edition video Sg, and the time code and the absolute track address corresponding to the delimitation are stored into the shot index table Tab1. This operation is continuously carried out with respect to the whole regular edition video, and on completion of reproduction of the regular edition video, a group of time codes delimiting the whole regular edition video into shots is formed in the shot index table Tab1.

Next, when the operator inputs a parameter i4 related to shot score calculation, the parameter setting means Ip4 sends the parameter as data P6a to the shot score organization and shot extraction means Prg6. When the operator inputs a rule i5 related to optimum shot calculation, the preview video organization rule setting means Ip5 sends the rule as data P6b to the shot score organization and shot extraction means Prg6. The shot score organization and shot extraction means Prg6 causes the recording medium reproducing unit VP to reproduce the regular edition video by each shot from the first shot with reference to the shot index table Tab1 and takes in the regular edition video Sg.

When the operator watches the video of one shot and inputs its video characteristic evaluation value i6 with a key, the video characteristic evaluation value i6 is inputted to the shot score organization and shot extraction means Prg6 via the video characteristic evaluation value input means Ip6. The shot score organization and shot extraction means Prg6 calculates the score of the corresponding shot on the basis of the evaluation value, then determines whether the corresponding shot is suitable for extraction or not on the basis of the shot score, and stores the data of the selected shot to the extracted shot table Tab6. The stored contents include the time code. The above-described processing is carried out for all the shots, and all the shots to be extracted are stored.

Next, when the operator inputs a desired preview video time as an input i4 to the preview video time adjustment means Prg8, the preview video time adjustment means Prg8 sequentially reads out the data of the extracted shots from the extracted shot table Tab6 and calculates the video time length of all the extracted shots connected. When the calculated video time length is longer or shorter than the desired preview video time, a modification instruction to restrict or relax the rule is sent to the preview video organization rule setting means Ip5, or a modification instruction to restrict or relax the parameter is sent to the parameter setting means Ip4.

On the basis of the modification, the shot score organization and shot extraction means Prg6 re-selects the shots to be extracted and updates the storage contents of the extracted shot table Tab6. The preview video time adjustment means Prg8 sequentially reads out the data of the updated extracted shots from the extracted shot table Tab6 and calculates the video time length of all the extracted shots connected. As the above-described processing is repeated, the data for the preview video in conformity with the desired preview video time is sent to the preview video organization means Prg9. The preview video organization means Prg9 controls the recording medium reproducing unit VP to reproduce and output the regular edition video Sg, and sequentially records the respective extracted shots to the video recording unit VR on the basis of this data. Thus, the preview video is organized.

The recording medium reproducing unit VP has a recording medium mounted therein or provided therein on which video signals are recorded together with recording position information related to the recording position or the time code, and has a function to read out, as reproductive signals, the video signals accessed on the basis of the recording position information or the time code from the recording medium. The recording medium reproducing unit VP is an independent unit having a unique microcomputer. As such a recording medium, a medium on which the recording position information is accessibly recorded is suitably, from among tape- or disk-shape magnetic recording media or optical media.

As such recording position information, for example, in the case of a video tape medium, the absolute track number related to the helical track or the time code is accessibly recorded on the helical track or a longitudinal track. In the case of a hard magnetic disk medium or an optical disc/magneto-optical disc medium, the track number or the sector number is recorded. Such recording position information is outputted to outside as the current address at the time of reproduction, and is searched for as the target address to start reproduction when designation input is carried out from outside.

In the present embodiment, the recording medium reproducing unit VP is outside unit. However, it can be provided inside the extracted video organization unit Athr1. For example, as a system having such a recording medium reproducing unit provided therein, an authoring system having as a platform a personal computer in which DVD plus RAM (DVD at the time of rewrite) are provided can be applied.

The recording medium reproducing unit VP performs start, stop or pause of reproduction in response to a control signal Cg inputted from the extracted video organization unit Athr1. The recording medium reproducing unit VP also starts reproduction at a predetermined track address based on the target address contained in the control signal Cg, and outputs the regular edition video Sg to the extracted video organization unit Athr1.

The above-described resolution into shots includes resolution by manual operation and automatic resolution.

The resolution into shots by manual operation is carried out while the regular edition video Sg is reproduced. There are two ways to carry out this operation as follows.

1. Pause or stop of reproduction of the regular edition video is performed for every one-shot resolution, and reproduction of the regular edition video is started again at the start of the next one-shot resolution.

2. Reproduction of the regular edition video is continuously carried out and shot delimitation is continuously carried out without performing any pause or stop of reproduction halfway.

The present embodiment employs the one-shot resolution of "1." If the setting of the shot score is carried out simultaneously with the resolution into shots, this one-shot resolution is suitable.

As described above, the extracted video organization unit Athr1 of the present embodiment can easily produce the semantic score. As a result, the operator can stably and efficiently produce a preview video of a predetermined level or higher by simple operation, even though the operator is not a professional creator.

In addition, in the case where the two-step screening is applied, the preview video can be organized by a reduced number of operations, thus realizing efficient production.

Moreover, by enabling setting of various threshold values and reflecting a plurality of different video characteristic items on the shot score, preview videos that meet various purposes can be organized. Also, by selecting the mode, different types of preview videos in accordance with the purpose such as outline, highlight, and main cast preview videos can be produced.

Furthermore, by automatically modifying the parameters and rules, time adjustment of the organized preview video is automatically carried out using the same semantic score, thus enabling more flexible production.

Also, since the preview video can be edited while confirming the configuration of story and the position of extracted scenes on the semantic graph (graph representation of video transition characteristics), it is possible to organize an appropriate preview video grasping the whole story.

An embodiment of the video information editing device according to the present invention will now be described with reference to FIGS. 22 and 23.

Figure 22:
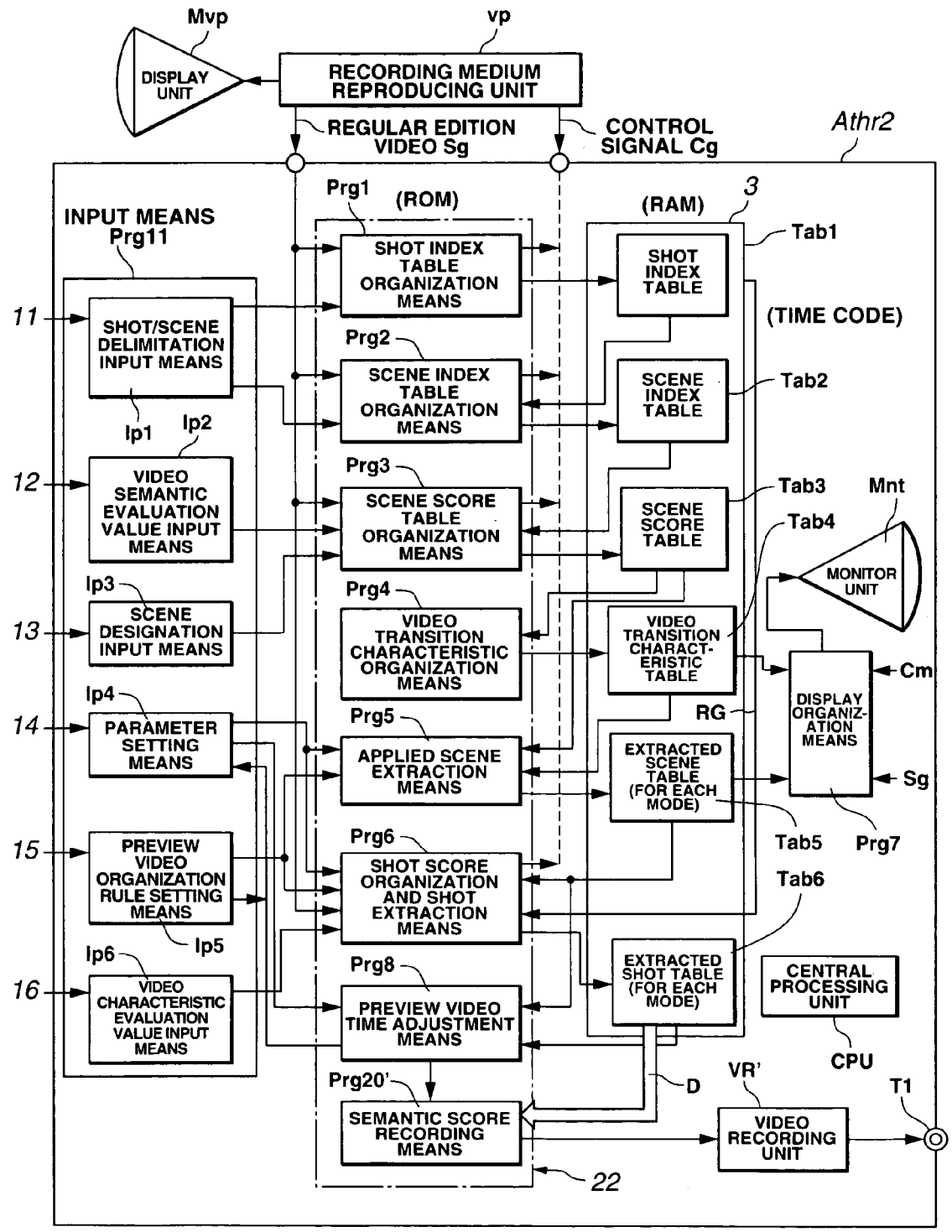
FIG. 22 is a block diagram showing the structure of an embodiment of the video information editing device according to the present invention.

FIG. 22 is a block diagram showing the structure of a video information editing device Athr2, which has the function to edit, record and save the semantic score. The same parts as those of the previous embodiment are denoted by the same numerals and are not described further in detail.

The video information editing device Athr2 is an authoring device connected with an outside recording medium reproducing unit VP. The video information editing device Athr2 has a central processing unit CPU such as a microcomputer, input means Prg11 and display organization means Prg7 which are readable and executable by the central processing unit CPU and mounted for the read-only use in a hybrid semiconductor memory, a recording medium 22 made up of a read-only memory ROM in which a program readable and executable by the central processing unit CPU is stored, a temporary storage unit 3 made up of a semiconductor memory like a DRAM, a monitor unit Mnt for screen display, and a video recording unit VR" capable of writing and reading the edited and organized semantic score. An output terminal T1 connected to the data recording unit VR" can also be provided. In addition, an overall control circuit and a power-supply circuit are provided but are not shown in the drawing.

The recording medium 22 is formed in a one-ship structure like a non-volatile semiconductor memory. The recording medium 22 has shot index table organization means Prg1, scene index table organization means Prg2, scene score table organization means Prg3, video transition characteristic organization means Prg4, applied scene extraction means Prg5, shot score organization and shot extraction means Prg6, preview video time adjustment means Prg8, and semantic score recording means Prg20', all of which are computer-executed programs.

By executing each of the above-mentioned programs, a shot index table Tab1, a scene index table Tab2, a scene score table Tab3, a video transition characteristic table Tab4, an extracted scene table Tab5, and an extracted shot table 6 are produced in the temporary storage unit 3.

Figure 23:
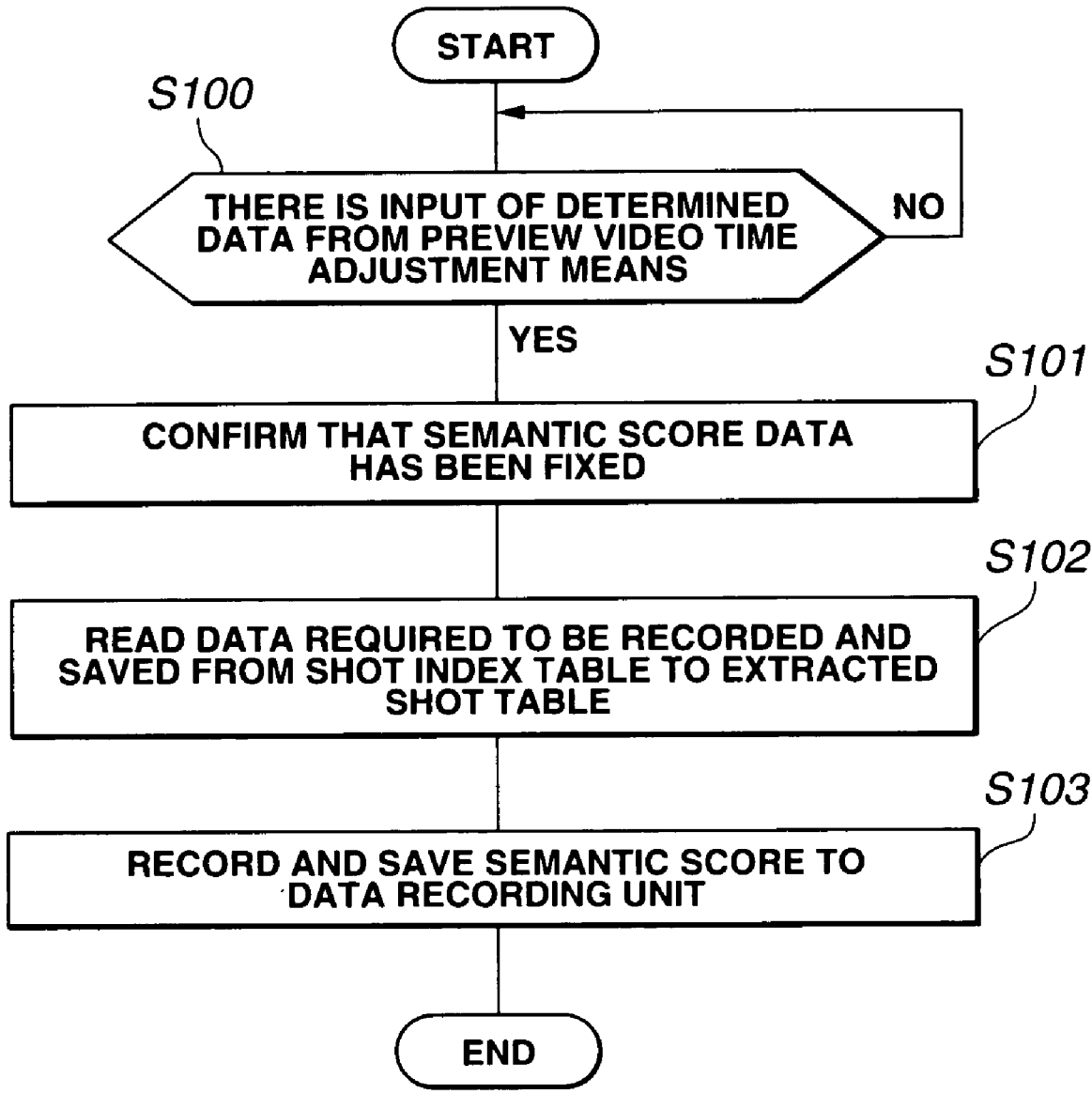
FIG. 23 is a flowchart showing the operation of semantic score recording means of the video information editing device shown in FIG. 22.

FIG. 23 is a flowchart showing the operation of the semantic score recording means 20'. At step S100, the semantic score recording means 20' waits for input of determined data from the preview video time adjustment means Prg8. If there is the input, the semantic score recording means 20' thus confirms that the semantic score data is determined. Then, if there is necessary data other than this determined data, the semantic score recording means 20' reads the necessary data D from the data stored in the tables of the shot index table Tab1 to the extracted shot table Tab6 (step S102), then edits the semantic score in the form of a table on the temporary memory, and records and saves it to the data recording unit VR'.

The edited semantic score can also be outputted to outside from the output terminal T1.

The output of the semantic score to outside is made directly from the temporary memory by the semantic score recording means Prg20' or via the data recording unit VR'.

Thus, the video information editing device Athr2 of the embodiment shown in FIG. 22 edits, records and saves the semantic score which enables time adjustment of compressed video (preview video) by an arbitrary change of the condition for selecting the scene to be extracted and the parameter of the preview video production rule and which enables automatic production of a preview video suitable for genre characteristics of a video title. In addition, it is possible to read out and use, or supply to outside, the semantic score at an arbitrary time point.

Another embodiment of the video information editing device according to the present invention will now be described with reference to FIGS. 24 and 25.

Figure 24:
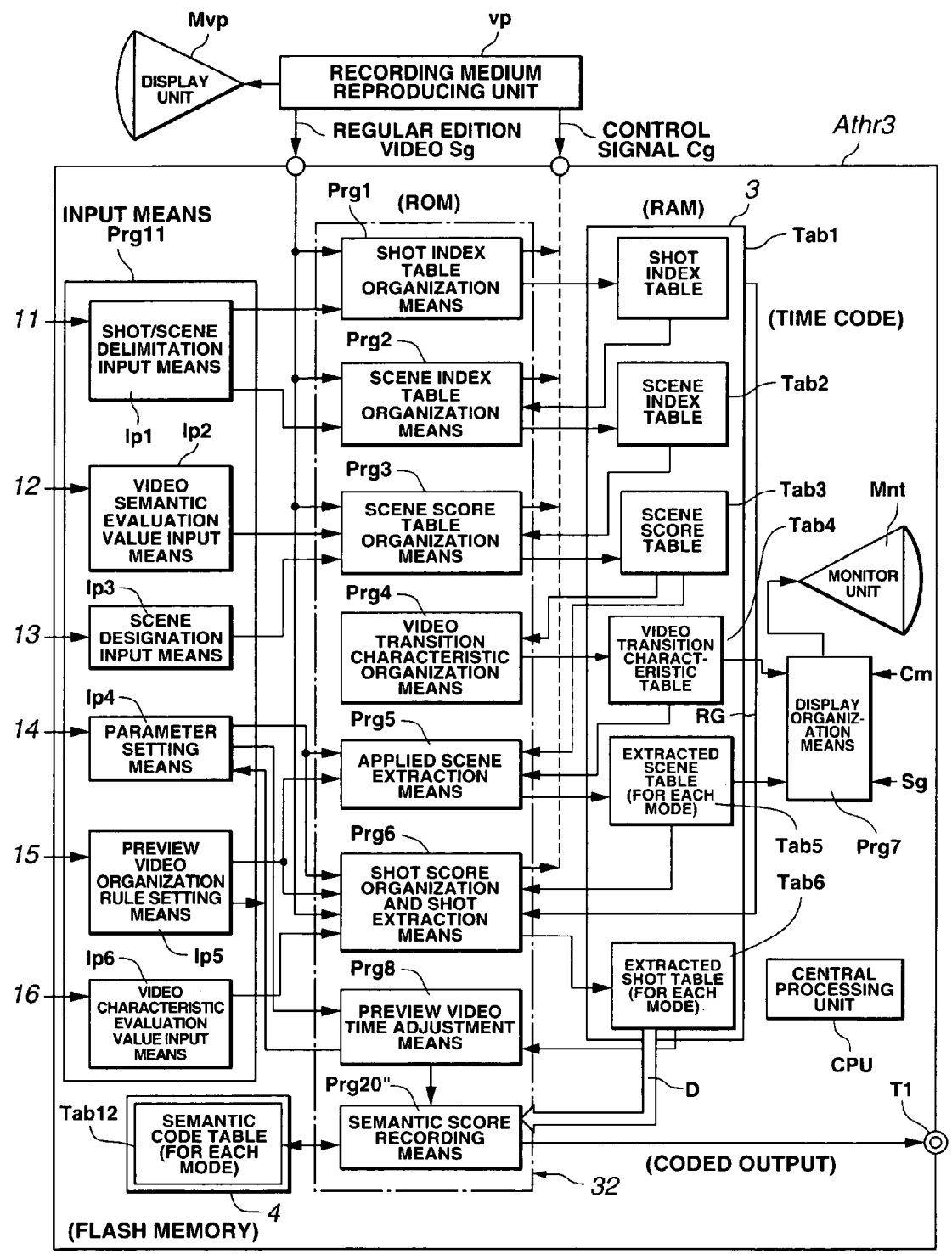
FIG. 24 is a block diagram showing the structure of another embodiment of the video information editing device according to the present invention.

FIG. 24 is a block diagram showing the structure of a video information editing device Athr3, which has the function to edit, output, record and save the semantic score. The same parts as those of the previous embodiment are denoted by the same numerals and are not described further in detail.

The video information editing device Athr3 is an authoring device connected with an outside recording medium reproducing unit VP. The video information editing device Athr3 has a central processing unit CPU such as a microcomputer, input means Prg11 and display organization means Prg7 which are readable and executable by the central processing unit CPU and mounted for the read-only use in a hybrid semiconductor memory, a recording medium 32 made up of a read-only memory ROM in which a program readable and executable by the central processing unit CPU is stored, a temporary storage unit 3 made up of a semiconductor memory like a DRAM, a flash memory 4, a monitor unit Mnt for screen display, and output terminal T1. In addition, an overall control circuit and a power-supply circuit are provided but are not shown in the drawing.

The recording medium 32 is formed in a one-ship structure like a non-volatile semiconductor memory. The recording medium 32 has shot index table organization means Prg1, scene index table organization means Prg2, scene score table organization means Prg3, video transition characteristic organization means Prg4, applied scene extraction means Prg5, shot score organization and shot extraction means Prg6, preview video time adjustment means Prg8, and semantic score organization means Prg20", all of which are computer-executed programs.

By executing each of the above-mentioned programs, a shot index table Tab1, a scene index table Tab2, a scene score table Tab3, a video transition characteristic table Tab4, an extracted scene table Tab5, and an extracted shot table 6 are produced in the temporary storage unit 3. By executing the semantic code organization means Prg20", a semantic code table Tab12 is produced in the flash memory 4.

Figure 25:
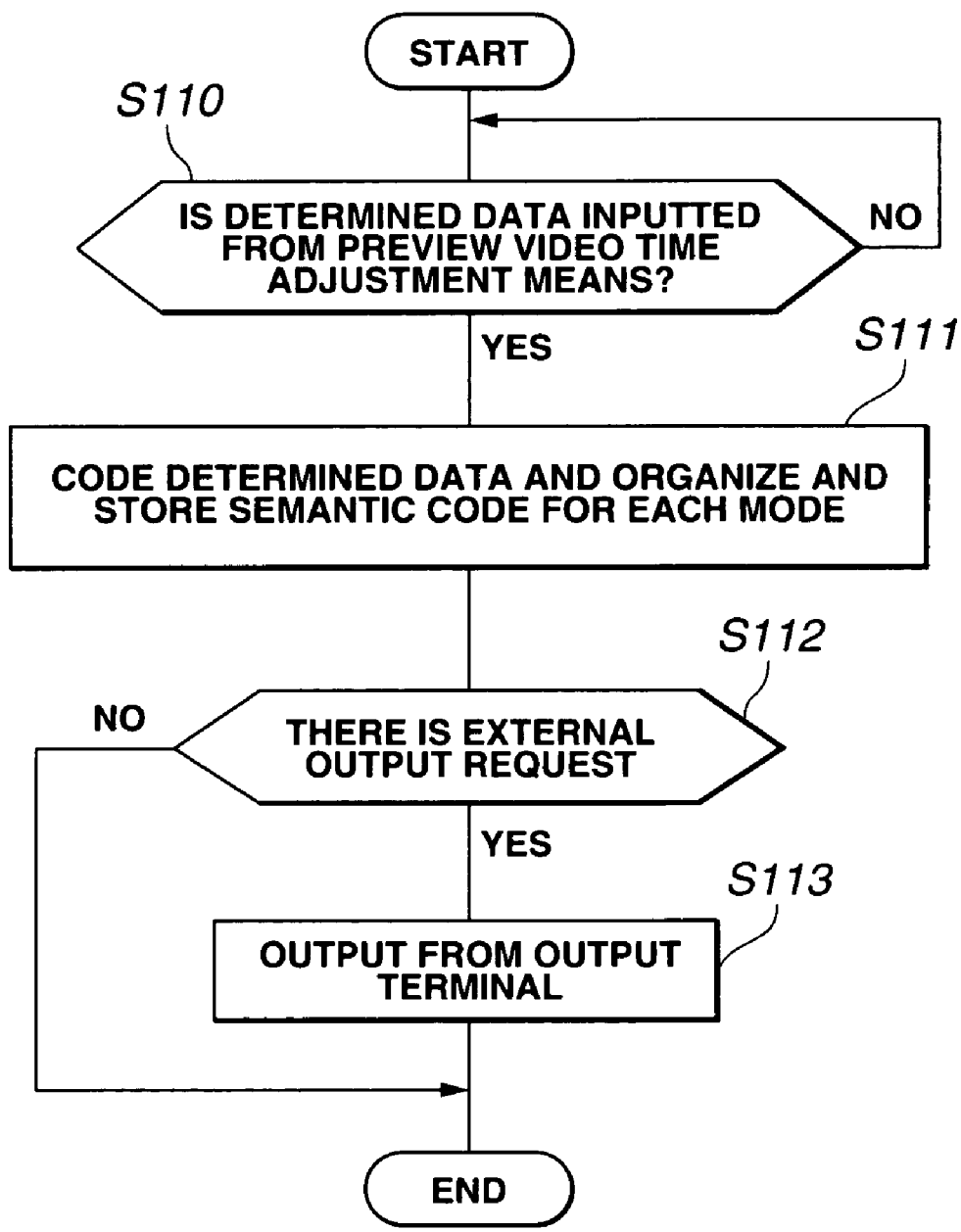
FIG. 25 is a flowchart showing the operation of semantic code organization means of the video information editing device shown in FIG. 24.

FIG. 25 is a flowchart showing the operation of the semantic score organization means 20". At step S110, the semantic score organization means 20" waits for input of determined data from the preview video time adjustment means Prg8. If there is the input, the semantic score organization means 20" thus confirms that the semantic score data is determined, then codes the determined data, edits the semantic code for each mode, and stores it as the semantic code table Tab12 into the flash memory 4 (step S111). If there is a request for output to outside (step S112), the coded data stored in the flash memory 4 is outputted from the output terminal T1.

Thus, the video information editing device Athr3 of the embodiment shown in FIG. 24 edits, outputs, records and saves the semantic code which enables automatic production of a preview video suitable for genre characteristics of a video title. In addition, it is possible to use the semantic code at an arbitrary time point.

As described above, the video information editing device according to the embodiment edits the semantic code which enables organization of preview videos for various purposes, on the basis of the scene score and the shot score obtained by evaluating each scene and each shot constituting the regular edition video of a video title in terms of the semantic phase of the story and the video characteristics, and in accordance with predetermined preview video organization rules for various purposes. The semantic code enables automatic production of preview videos suitable for various purposes from the regular edition video of the video titles.

Specifically, the preview video organization rule such that conditions are set for each of various modes for various purposes is used, and a mode is selected so that the condition for each mode is extracted. On the basis of the condition for each mode, the semantic code which enables automatic production of preview videos of various modes including outline, highlight, and main cast modes can be edited and produced. As a result, at least the data set for each mode is described in the form of codes in the produced semantic code.

As the prescribed cut seconds of a video to be cut out from a shot or scene video, the threshold value for a peak scene, the threshold value for an upward slope to the peak and the threshold value for a downward slope from the peak, or the threshold values of positive and negative scene scores, are designated as different numbers of seconds.

According to the video information editing method and the video information editing device of the present invention, a shot or scene is selected such that an evaluation value made for each shot or for each scene meets a predetermined condition, and data including information about the selected shot or scene is recorded and saved. Therefore, organization of a connected video consisting of shots only, organization of a connected video consisting of scenes only, and organization of a connected video of shots and scenes using the recorded and saved data are made possible. Thus, it is possible to provide data which enables organization of a connected video corresponding to the purpose.

In addition, data which facilitates organization of various types of connected videos and which enables automatic organization of a connected video of an arbitrary time length by carrying out automatic adjustment to match the video time length with a desired time length can be provided.

Particularly, in the video information editing method and the video information editing device according to the present invention, if scenes having a scene evaluation value meeting a predetermined first condition are selected, and shots having a shot evaluation value meeting a predetermined second condition is selected from the shots contained in each of the selected scenes, the shots to be selected can be efficiently obtained by the extraction processing of a smaller number of times, and the data including information about the selected shot or scene can be efficiently recorded and saved.

Also, according to the video information editing method and the video information editing device of the present invention, a shot or scene is selected such that an evaluation value made for each shot or for each scene meets a predetermined condition, and data including information about the selected shot or scene is coded and outputted, or recorded and saved. Therefore, organization of a connected video consisting of shots only, organization of a connected video consisting of scenes only, and organization of a connected video of shots and scenes using the coded are made possible. Thus, it is possible to provide coded data which enables organization of a connected video corresponding to the purpose.

In addition, data which facilitates organization of various types of connected videos and which enables automatic organization of a connected video of an arbitrary time length by carrying out automatic adjustment to match the video time length with a desired time length can be provided.

Particularly, in the video information editing method and the video information editing device according to the present invention, if scenes having a scene evaluation value meeting a predetermined first condition are selected, and shots having a shot evaluation value meeting a predetermined second condition is selected from the shots contained in each of the selected scenes, the shots to be selected can be efficiently obtained by the extraction processing of a smaller number of times, and the coded data including information about the selected shot or scene can be efficiently outputted, or recorded and saved.

Moreover, in the video information editing method and the video information editing device of the present invention, in selecting scenes to be extracted, the processing for specifying scenes of greater effects can be facilitated by extracting scene such that the absolute value of the scene evaluation value reached a predetermined threshold value.

Also, in the video information editing method and the video information editing device of the present invention, an optimum scene for a designated purpose can be extracted by setting a threshold value for each area between a peak or valley scene and the adjacent valley or peak scene determined by the integration value of the evaluation value of each scene along the scene transition, as the threshold value used for selecting scenes to be extracted.

Alternatively, in the video information editing method and the video information editing device of the present invention, the number of target scenes is limited and efficient selection work is made possible by handling only the scenes on an upward slope to a peak from the adjacent valley before this peak and the scenes on a downward slope immediately after the peak, on the basis of the magnitude of increase in the integration value of the valley scene and the peak scene after the valley or on the basis of the ranking of the magnitude of increase in the integration value, as target scenes in selecting scene to be extracted.

Moreover, in the video information editing method and the video information editing device of the present invention, as the threshold value used for selecting scenes to be extracted is set in accordance with an upward slope from a valley to the adjacent peak or a downward slope from a peak to the adjacent valley, scenes to be extracted are not concentrated in a specified part but employed from the whole video, and extraction for a well-balanced connected video is made possible.

Also, in the video information editing method and the video information editing device of the present invention, as the shot evaluation value, a value obtained by carrying out predetermined weighting on each of the video characteristic items including at least the presence of a speech, the volume of a predetermined level or higher, the appearance of a specified actor/actress, or the special picture effect in the corresponding part of the regular edition video, is added with respect to each of the items. Thus, the predetermined weighting can be changed in accordance with the purpose and shots suitable for the purpose can be effectively extracted. Particularly, by employing a greater weighting value on the item related to the appearance of a specified actor/actress than the weighting values on the other items, the extraction of the shots emphasizing the cast can be made effective.

The invention claimed is:

1. A video information editing method comprising the steps of:
   delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes;
   preparing an evaluation value of each of the shots or each of the scenes on the basis of the information provided corresponding to each of the shots or each of the scenes,
   wherein the information provided includes semantic evaluation information, and
   wherein the information provided includes information relating to a presence/absence of a single or a plurality of video characteristic items; and
   selecting from the regular edition video the shots or the scenes such that each of the evaluation values of the shots or the scenes satisfies a predetermined condition.

2. A video information editing method comprising the steps of:
   delimiting at timing of a delimiting instruction a regular edition video, constituted by continuous dynamic images recorded along with recording position information or time lapse information, into shots as units of dynamic images and into scenes each containing at least one shot with the recording position information or the time lapse information associated with the shots or scenes;
   preparing a semantic evaluation value of each of the scenes on the basis of the information provided corresponding to each of the scenes;
   selecting from the regular edition video the scenes such that each of the semantic evaluation values of the scenes satisfies a predetermined first condition;
   preparing an evaluation value of at least one of the shots included in each of the selected scenes on the basis of the information provided corresponding to a single or a plurality of video characteristic items of the shots; and
   selecting the shots such that each of the evaluation values of the shots satisfies a predetermined second condition,
   wherein the first and second condition are set in accordance with a type of preview, the type of preview being selected from a plurality of types of previews, which are set for different purposes.

3. A video information editing device comprising:
   means for delimiting at timing of a delimiting instruction a regular edition video, constituted by continuous dynamic images recorded along with recording position information or time lapse information, into shots as units of dynamic images or into scenes each containing at least one shot with the recording position information or the time lapse information associated with the shots or scenes;
   means for preparing an evaluation value of each of the shots or each of the scenes on the basis of the information provided corresponding to each of the shots or each of the scenes,
   wherein the information provided includes semantic evaluation information, and
   wherein the information provided includes information relating to a presence/absence of a single or a plurality of video characteristic items; and
   means for selecting from the regular edition video the shots or the scenes such that each of the evaluation values of the shots or the scenes satisfies a predetermined condition.

4. A video information editing device comprising:
   means for delimiting at timing of a delimiting instruction a regular edition video, constituted by continuous dynamic images recorded along with recording position information or time lapse information, into shots as units of dynamic images and into scenes each containing at least one shot with the recording position information or the time lapse information associated with the shots or scenes;
   means for preparing a semantic evaluation value of each of the scenes on the basis of the information provided corresponding to each of the scenes;
   means for selecting from the regular edition video the scenes such that each of the semantic evaluation values of the scenes satisfies a predetermined first condition;
   means for preparing an evaluation value of at least one of the shots included in each of the selected scenes on the basis of the information provided corresponding to a single or a plurality of video characteristic items of the shots; and
   means for selecting the shots such that each of the evaluation values of the shots satisfies a predetermined second condition,
   wherein the first and second conditions are set in accordance with a type of preview, the type of preview being selected from a plurality of types of previews, which are set for different purposes.

5. The video information editing device as claimed in claim 4, further comprising means for, if the length of a video produced by connecting selected shots exceeds a predetermined video time, modifying at least one of the predetermined first condition and second condition and repeating the processing until the length of the video becomes equal to the predetermined video time.

6. The video information editing device as claimed in claim 4, wherein the predetermined first condition is that an absolute value of the scene evaluation value related to the scene reaches a predetermined threshold value, and
   wherein with respect to an integration value of the evaluation value related to each of the scenes along the scene transition, the scene is a peak scene when the continuous increase of the integration value up to a scene exceeds a predetermined first gap value and the absolute value of the continuous decrease of the integration value after that scene exceeds a predetermined second gap value,
   while the scene is a valley scene when the absolute value of the continuous decrease of the integration value up to a scene exceeds a predetermined third gap value and the continuous increase of the integration value after that scene exceeds a predetermined fourth gap value, and
   the threshold value is determined for each area between the peak or valley scene and the adjacent valley or peak scene.

7. The video information editing device as claimed in claim 6, wherein the predetermined first condition is that the absolute value of the scene evaluation value related to the scenes reaches a predetermined threshold value, and the threshold value is set in accordance with the upward slope from the valley to the adjacent peak or the downward slope from the peak to the adjacent valley.

8. The video information editing device as claimed in claim 6, wherein the predetermined first condition is that the absolute value of the scene evaluation value related to the scenes reaches a predetermined threshold value, and when each of the evaluation values is formed by a positive or negative value, the absolute value of the threshold value applied to the positive evaluation value is made equal to or smaller than the absolute value of the threshold value applied to the negative evaluation value.

9. The video information editing device as claimed in claim 4, wherein with respect to an integration value of the evaluation value related to each of the scenes along the scene transition, the scene is a peak scene when the continuous increase of the integration value up to a scene exceeds a predetermined first gap value and an absolute value of the continuous decrease of the integration value after that scene exceeds a predetermined second gap value, while the scene is a valley scene when the absolute value of the continuous decrease of the integration value up to a scene exceeds a predetermined third gap value and the continuous increase of the integration value after that scene exceeds a predetermined fourth gap value, and the predetermined first condition is applied to the scenes on the upward slope to the peak from the adjacent valley before the peak and the scenes on the downward slope immediately after the peak, on the basis of the magnitude of the increase of the integration value of the valley scene and the adjacent peak scene after the valley, or on the basis of the ranking of the magnitude of the increase of the integration value.

10. The video information editing device as claimed in claim 4, wherein the shot evaluation value is a value obtained by adding a value obtained by carrying out predetermined weighting on each of the video characteristic items including at least the presence of a speech, the volume of a predetermined level or higher, the appearance of a specified actor/actress, or the special picture effect in the corresponding part of the regular edition video, with respect to each of the items.

11. The video information editing device as claimed in claim 10, wherein with respect to the shot evaluation value, the weighting value on the item related to the appearance of a specified actor/actress is made greater than the weighting values on the other items.

12. A video information editing device comprising:
means for delimiting at timing of a delimiting instruction a regular edition video, constituted by continuous dynamic images recorded along with recording position information or time lapse information, into shots as units of dynamic images and into scenes each containing at least one shot with the recording position information or the time lapse information associated with the shots or scenes;
means for preparing a semantic evaluation value of each of the scenes on the basis of the information provided corresponding to each of the scenes;
means for selecting from the regular edition video the scenes such that each of the semantic evaluation values of the scenes satisfies a predetermined first condition;
means for preparing an evaluation value of at least one of the shots included in each of the selected scenes on the basis of the information provided corresponding to a single or a plurality of video characteristic items of the shots,
wherein the information provided corresponding to each of the shots includes semantic evaluation information and video characteristic items;
means for selecting the shots such that each of the evaluation values of the shots satisfies a predetermined second condition; and
means for coding the information of the recording position information or the time lapse information corresponding to each of the selected shots and data including at least the shot evaluation value, wherein the first and second conditions are set in accordance with a type of preview, the type of preview being selected from a plurality of types of previews, which are set for different purposes.

13. A method for generating a preview from a video comprising the steps of:
accessing a segment of the video;
establishing a plurality of shots from the segment of the video;
providing semantic evaluation information related to content of one or more of the plurality of shots;
evaluating a single or a plurality of video characteristics of one or more of the plurality of shots;
selecting particular shots as a function of the semantic evaluation information and the single or plurality of video characteristics; and
generating the video by concatenating the selected particular shots such that the video has a predetermined time duration,
wherein the selecting particular shots is performed using predetermined conditions associated with a type of preview, the type of preview being selected from a plurality of types of previews, which are set for different preview purposes.

14. An apparatus for generating a preview from a video comprising:
means for accessing a segment of the video;
means for establishing a plurality of shots from the segment of the video;
means for providing semantic evaluation information related to content of one or more of the plurality of shots;
means for evaluating a single or a plurality of video characteristics of one or more of the plurality of shots;
means for selecting particular shots as a function of the semantic evaluation information and the single or a plurality of video characteristics; and
means for generating the video by concatenating the selected particular shots such that the video has a predetermined time duration,
wherein the selecting particular shots is performed using predetermined conditions associated with a type of preview, the type of preview being selected from a plurality of types of previews, which are set for different preview purposes.

15. A computer-readable medium adapted to store a computer program for generating a preview from a video, comprising:
program code for accessing a segment of the video;
program code for establishing a plurality of shots from the segment of the video;
program code for providing semantic evaluation information related to content of one or more of the plurality of shots;
program code for evaluating a single or a plurality of video characteristics of one or more of the plurality of shots;
program code for selecting particular shots as a function of the semantic evaluation information and the a single or a plurality of video characteristics; and
program code for generating video by concatenating the selected particular shots such that the video has a predetermined time duration,
wherein the selecting particular shots is performed using predetermined conditions associated with a type of preview, the type being selected from a plurality of types of previews, which are set for different preview purposes.

* * * * *

UNITED STATES PATENT AND TRADEMARK OFFICE
CERTIFICATE OF CORRECTION

| | | |
|---|---|---|
| PATENT NO. | : 7,904,813 B1 | Page 1 of 1 |
| APPLICATION NO. | : 09/869254 | |
| DATED | : March 8, 2011 | |
| INVENTOR(S) | : Yasushi Takahashi et al. | |

It is certified that error appears in the above-identified patent and that said Letters Patent is hereby corrected as shown below:

Title page Add

Item

--(30)  Foreign Application Priority Data

December 28, 1998  JP  10/373855--.

Signed and Sealed this
Seventh Day of June, 2011

David J. Kappos
*Director of the United States Patent and Trademark Office*